United States Patent
Wang et al.

(10) Patent No.: US 9,135,417 B2
(45) Date of Patent: Sep. 15, 2015

(54) APPARATUS FOR GENERATING SECURE KEY USING DEVICE AND USER AUTHENTICATION INFORMATION

(71) Applicant: SAMSUNG ELECTRONICS CO., LTD., Suwon-si, Gyeonggi-do (KR)

(72) Inventors: Weixin Wang, Gyeonggi-do (KR); Hee-Chang Cho, Seoul (KR); Won-Seok Lee, Gyeonggi-do (KR); Min-Wook Kim, Seoul (KR); Hyoung-Suk Jang, Gyeonggi-do (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 141 days.

(21) Appl. No.: 13/798,475

(22) Filed: Mar. 13, 2013

(65) Prior Publication Data
US 2013/0318358 A1 Nov. 28, 2013

(30) Foreign Application Priority Data
May 24, 2012 (KR) ........................ 10-2012-0055527

(51) Int. Cl.
H04L 9/08 (2006.01)
G06F 21/31 (2013.01)
G06F 21/57 (2013.01)

(52) U.S. Cl.
CPC ................ *G06F 21/31* (2013.01); *G06F 21/57* (2013.01); *H04L 9/0866* (2013.01); *G06F 2221/2105* (2013.01); *G06F 2221/2107* (2013.01)

(58) Field of Classification Search
None
See application file for complete search history.

(56) References Cited

U.S. PATENT DOCUMENTS 7,861,312 B2 12/2010 Lee et al.
7,945,776 B1 5/2011 Atzmony et al.
(Continued)

FOREIGN PATENT DOCUMENTS

GB 2404487 2/2005
JP 2006-520967 9/2006
(Continued)

OTHER PUBLICATIONS

Australian Office Action dated Sep. 2, 2014 issued by Australian Intellectual Property Office for corresponding Australian Patent Appln. No. 2013205529.
(Continued)

*Primary Examiner* — Benjamin Lanier
*Assistant Examiner* — Malcolm Cribbs
(74) *Attorney, Agent, or Firm* — F. Chau & Associates, LLC

(57) ABSTRACT

A secure key generating apparatus comprising an ID calculating unit receiving a primitive ID from a first storage device and calculating a first media ID, (a unique identifier of the first storage device), from the first primitive ID; a user authentication information providing unit providing user authentication information for authenticating the current; and a secure key generating unit for generating a first Secure Key using both the first media ID and the first user's authentication information. The Secure Key is used to encrypt/decrypt content stored in the first storage device. The secure key generating unit generates a first different Secure Key using a second media ID of a second storage device, and generates a second different Secure Key using second user's user authentication information. Only the first Secure Key can be used to decrypt encrypted content stored in the first storage device that was encrypted using the first Secure Key.

28 Claims, 20 Drawing Sheets

(56) References Cited

U.S. PATENT DOCUMENTS

| | | | |
|---|---|---|---|
| 2004/0210707 | A1* | 10/2004 | Ohara et al. ................. 711/103 |
| 2005/0044045 | A1 | 2/2005 | Pelly et al. |
| 2005/0235143 | A1* | 10/2005 | Kelly ........................... 713/165 |
| 2008/0040814 | A1 | 2/2008 | Kasahara et al. |
| 2009/0164801 | A1* | 6/2009 | Kawahara ..................... 713/189 |
| 2009/0172795 | A1 | 7/2009 | Ritari et al. |
| 2009/0282264 | A1* | 11/2009 | Amiel et al. ................. 713/189 |
| 2011/0215908 | A1* | 9/2011 | Lee et al. ..................... 340/10.1 |
| 2011/0219427 | A1 | 9/2011 | Hito et al. |
| 2011/0246738 | A1* | 10/2011 | Nakamura et al. ............ 711/163 |
| 2011/0252243 | A1* | 10/2011 | Brouwer et al. .............. 713/189 |
| 2012/0101623 | A1 | 4/2012 | Hwang et al. |
| 2012/0303974 | A1* | 11/2012 | Lin et al. ...................... 713/193 |
| 2014/0013453 | A1* | 1/2014 | Futa et al. ....................... 726/32 |

FOREIGN PATENT DOCUMENTS

| | | |
|---|---|---|
| KR | 1020040031083 | 4/2004 |
| KR | 1020040039443 | 5/2004 |
| KR | 10-0506559 | 7/2005 |
| KR | 1020060107954 | 10/2006 |
| KR | 1020070001785 | 1/2007 |
| KR | 1020080069782 | 7/2008 |
| WO | 2006/008924 | 1/2006 |

OTHER PUBLICATIONS

Netherlands Search Report (issuance date: Feb. 25, 2015) issued for corresponding Netherlands patent application No. 2010681 which was filed on Apr. 22, 2013.

* cited by examiner

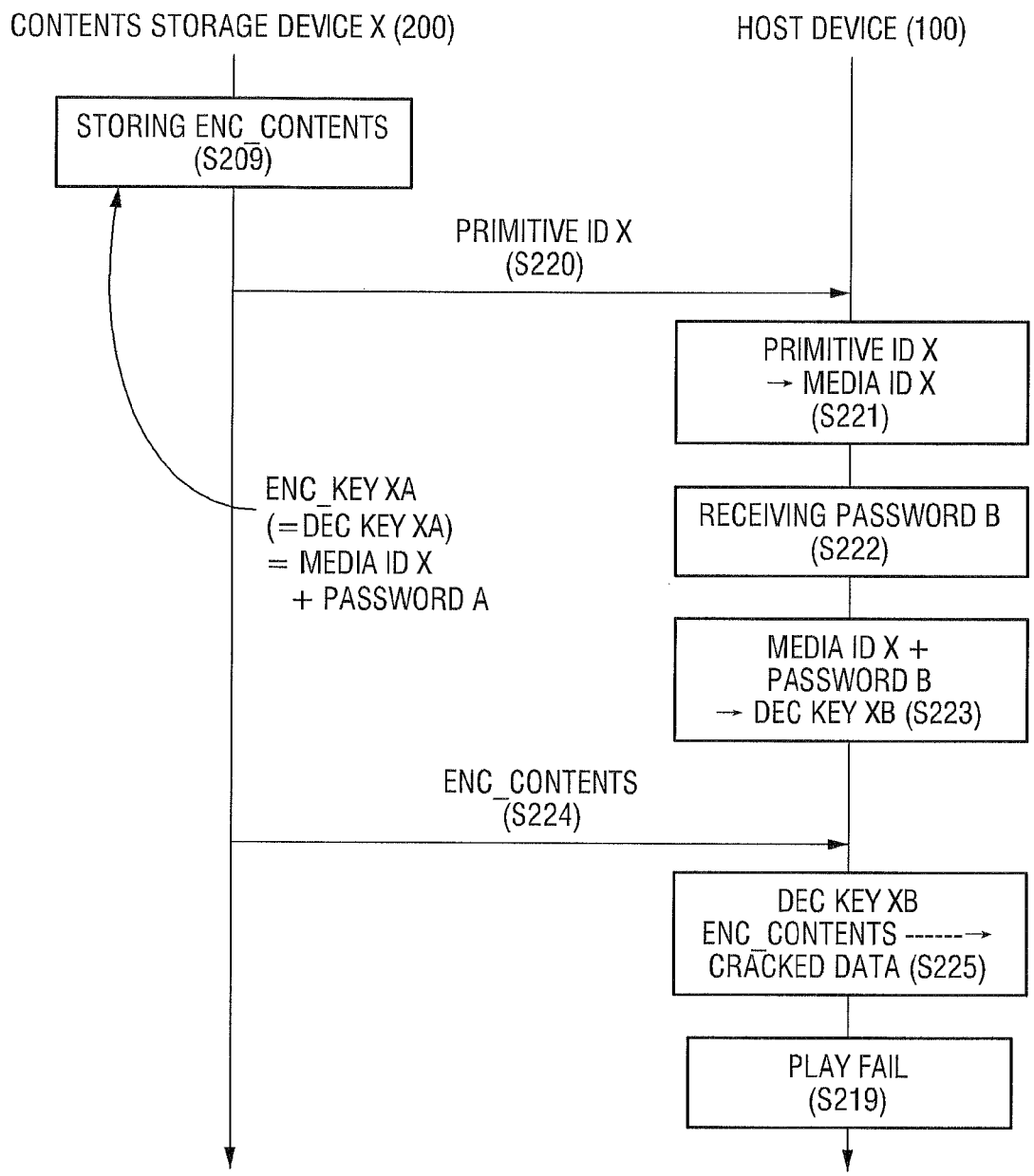

APPARATUS FOR GENERATING SECURE KEY USING DEVICE AND USER AUTHENTICATION INFORMATION

This application claims priority from Korean Patent Application No. 10-2012-0055527 filed on May 24, 2012 in the Korean Intellectual Property Office, which is incorporated herein by reference in its entirety.

BACKGROUND

1. Technical Field

The inventive concept relates to a secure key generating apparatus, and more particularly, to an apparatus for generating a secure key, which belongs to both a specific device and a specific user, using both a device ID and user authentication information (such as a user password), a storage device using the secure key, and a secure key generating method.

2. Discussion of the Related Art

Recently, various types of portable storage devices have been introduced to the market. These portable storage devices are becoming larger in storage capacity and smaller in volume, and their interface is insertable into/removable from commonly available host devices (e.g. computers, on-demand printers, cellular phone, digital televisions, etcetera). Thus, the demand for portable storage devices is increasing. Some examples of the portable storage devices include a memory card (e.g., SD card) that uses a flash memory as a storage medium, a universal serial bus (USB) memory ("USB drive") that can be connected to a USB port, and a solid state drive (SSD). Additionally, portable hard disks have been evaluated as inexpensive storage devices, and an external hard disk drives have been introduced. The external hard disk drive offers portability unlike a conventional hard disk drive fixed to a personal computer.

This trend is not limited to the portable storage devices. Host devices which can be connected to the portable storage devices are also becoming smaller. Accordingly, an environment in which digital content stored in a portable storage device can be enjoyed anytime and anywhere has been created. With the creation of this environment, commercially produced digital content are increasingly being distributed and sold in the form of digital data. This increases the importance of technologies that prevents the illegal copying of digital content.

To prevent the illegal copying of digital content, the digital content may be encrypted and then stored in a portable storage device. Here, the digital content are encrypted using a specific digital encryption key. Encryption and decryption technology that uses a digital encryption key associated only with a specific device removes protection for data when the specific device is used.

SUMMARY

Aspects of the present invention provide an apparatus for generating a Secure Key which belongs to both a specific device and a specific user, a storage device encrypting content using the Secure Key and storing the encrypted content, and a secure key generating method. While conventional encryption and decryption technology uses a key associated only with a specific device and removes protection for data when the specific device is used aspects of the present invention provide an apparatus for generating a Secure Key which belongs to both a specific device and a specific user, such that only a specific person can play the content (e.g., on the specific device) in order to protect his or her privacy. Aspects of the present invention provide a technology that generates and utilizes a Secure Key which belongs not only to a specific device but also to a specific user.

Aspects of the present invention also provide an apparatus for generating a Secure Key using both an identifier of a specific device and user authentication information input by a user, a storage device encrypting content using the Secure Key and storing the encrypted content, and a secure key generating method.

Aspects of the present invention also provide an apparatus for safely generating a Secure Key in a host device which supports trusted computing.

Aspects of the present invention also provide a host device which generates a Secure Key in a trusted execution environment in order to prevent the leakage of a device ID, user authentication information, and the generated Secure Key.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a secure key generating apparatus comprising an ID calculating unit receiving a primitive ID from a storage device and calculating a media ID, which is a unique identifier of the storage device, from the primitive ID; an authentication information providing unit providing user-authentication information for authenticating a user to a secure key generating unit; and the secure key generating unit generating a Secure Key using both the media ID and the authentication information.

According to another aspect of the present invention, there is provided a secure key generating apparatus comprising a storage interface receiving a primitive ID from a storage device and providing the primitive ID to a processor and the processor calculating a media ID, which is a unique identifier of the storage device, from the primitive ID and generating a Secure Key using both the media ID and user-authentication information for authenticating a user.

According to another aspect of the present invention, there is provided A storage device comprising a memory element storing a memory ID which is a unique identifier of the memory element and an encrypted memory ID which is obtained by encrypting the memory ID, a host interface receiving user-authentication information for authenticating a user from a host device and providing the authentication information to a secure key generating unit and receiving content from the host device and providing the content to an encrypting unit, a memory derived ID calculating unit reading the encrypted memory ID from the memory element, obtaining the memory ID by decrypting the encrypted memory ID, and generating a memory derived ID, which is another unique identifier of the memory element, using the memory ID, the secure key generating unit generating a Secure Key using both the authentication information and the memory derived ID and the encrypting unit encrypting the content using the Secure Key and storing the encrypted content in the memory element.

A secure key generating method comprising electrically connecting a storage device to a secure key generating apparatus, receiving a primitive ID from the storage device and calculating a media ID, which is a unique identifier of the storage device, from the primitive ID by using the secure key generating apparatus, receiving user-authentication information for authenticating a user directly from the user or receiving the authentication information from another device connected through a network by using the secure key generating apparatus and generating a Secure Key utilizing both the media ID and the authentication information by using the secure key generating apparatus.

The present invention will now be described more fully hereinafter with reference to the accompanying drawings, in which exemplary embodiments of the invention are shown. This invention may, however, be embodied in different forms and should not be construed as limited to exemplary embodiments set forth herein. Rather, the exemplary embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

BRIEF DESCRIPTION OF THE DRAWINGS

The above and other aspects and features of the present invention will become more apparent by describing in detail exemplary embodiments thereof with reference to the attached drawings, in which:

FIG. 23 is a flowchart illustrating a process of failing to decrypt content when incorrect user authentication information was input according to an exemplary embodiment of the present invention.

DETAILED DESCRIPTION OF THE EXEMPLARY EMBODIMENTS

Figure 1:
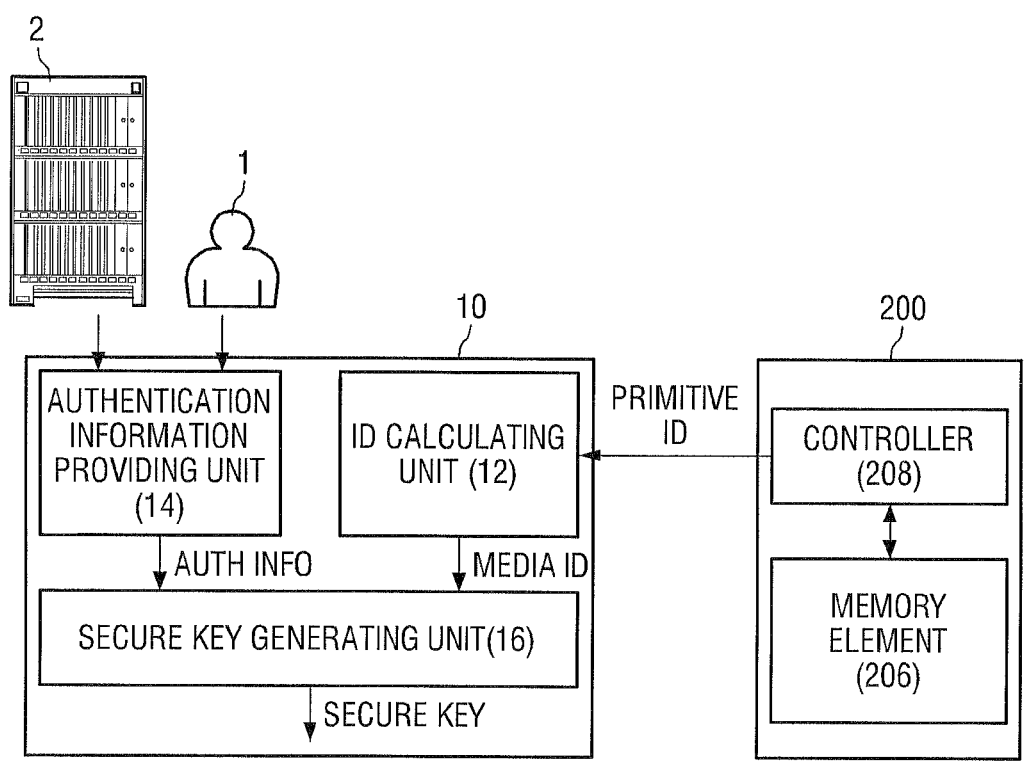
FIG. 1 is a block diagram of a secure key generating apparatus according to an exemplary embodiment of the present invention.

The configuration and operation of a secure key generating apparatus 10 according to an exemplary embodiment of the present invention will now be described with reference to FIG. 1. The secure key generating apparatus 10 according to the current exemplary embodiment is connected to a nonvolatile storage device 200 and generates a Secure Key using a media ID and authentication information for authenticating a user 1. The media ID is a unique identifier of the storage device 200.

The secure key generating apparatus 10 is connected to the storage device 200 and receives a primitive ID from the storage device 200. The primitive ID is one or more ID data used to calculate the media ID. The primitive ID is different data from the media ID. The secure key generating apparatus 10 generates the media ID from the primitive ID, and not from the authentication information for authenticating a user 1. Thus, from the storage device 200, the secure key generating apparatus 10 does not receive the media ID but receives the primitive ID (source data) used to generate the media ID. This can prevent the leakage or detection of the media ID. The secure key generating apparatus 10 may store data used to generate the media ID from the primitive ID.

The secure key generating apparatus 10 according to the current exemplary embodiment includes an ID calculating unit 12, an authentication information providing unit 14, and a secure key generating unit 16. The ID calculating unit 12 receives a primitive ID stored in a storage device and calculates a media ID (which is a unique identifier of the storage device) from the primitive ID.

The authentication information providing unit 14 provides the secure key generating unit 16 with the authentication information used to authenticate the user 1. The authentication information may be input to the secure key generating apparatus 10 directly by the user 1. Alternatively, a user authenticating server 2 may provide the user authentication information to the secure key generating apparatus 10. Thus, the authentication information providing unit 14 may provide the authentication information received from the user 1 or from the user authenticating server 2 to the secure key generating unit 16. The authentication information may be, for example, user authentication information used in a certain membership service, user identification information, or personal information. The personal information is information related to personal details of an individual. Examples of the personal information may include address, birthday, phone number, mail address, resident registration number, biometric information of the user, and a code corresponding to a certain number on a financial security card used by the user 1.

The secure key generating unit 16 generates the Secure Key using the media ID and the authentication information. Using the media ID in the generation of the Secure Key denotes that the media ID is input at least once to generate the Secure Key. In addition, using the authentication information in the generation of the Secure Key denotes that the authentication information is input at least once to generate the Secure Key.

The secure key generating unit 16 may generate the Secure Key by performing a binary operation on the media ID and the authentication information. Examples of the binary operation may include AND, OR, NOR, XOR, and NAND operations. The secure key generating unit 16 may also generate the Secure Key by performing a string concatenation (STRCAT) operation on the media ID and the authentication information. In the STRCAT operation, strings can be concatenated in no fixed order. Thus, the media ID and the authentication information can be concatenated in this order or the reverse order.

The authentication key generating unit 16 may generate the Secure Key using the media ID and the authentication information only or using one or more variable or invariable data in addition to the media ID and the authentication information.

The Secure Key can be generated only when all of the user authentication information, the media ID, and a Secure Key calculation formula are available. Thus, as long as the Secure Key itself is not leaked, even if the secure key calculation formula is revealed, the Secure Key cannot be generated unless both of the user authentication information and the media ID are identified. The media ID is a value that is not leaked and can be obtained only from operation upon the primitive ID provided by the storage device 200. In addition, the authentication information is a value that is not easily leaked since it would be managed by the user 1 to prevent its leakage. Therefore, the secure key generating apparatus 10 according to the current exemplary embodiment generates the Secure Key that belongs to the storage device 200 as well as to the user 1.

The operation of the ID calculating unit 12 that calculates a media ID from a primitive ID will now be described in greater detail with reference to FIGS. 2 and 3.

As mentioned above, the primitive ID is different data from the media ID and is also used to identify at least a first part of the storage device 200. For example, the storage device 200 may include a first part and a second part and provide a first primitive ID which is an identifier of the first part and a second primitive ID which is an identifier of the second part to the ID calculating unit 12. Here, the primitive ID includes the first primitive ID and the second primitive ID.

Figure 2:
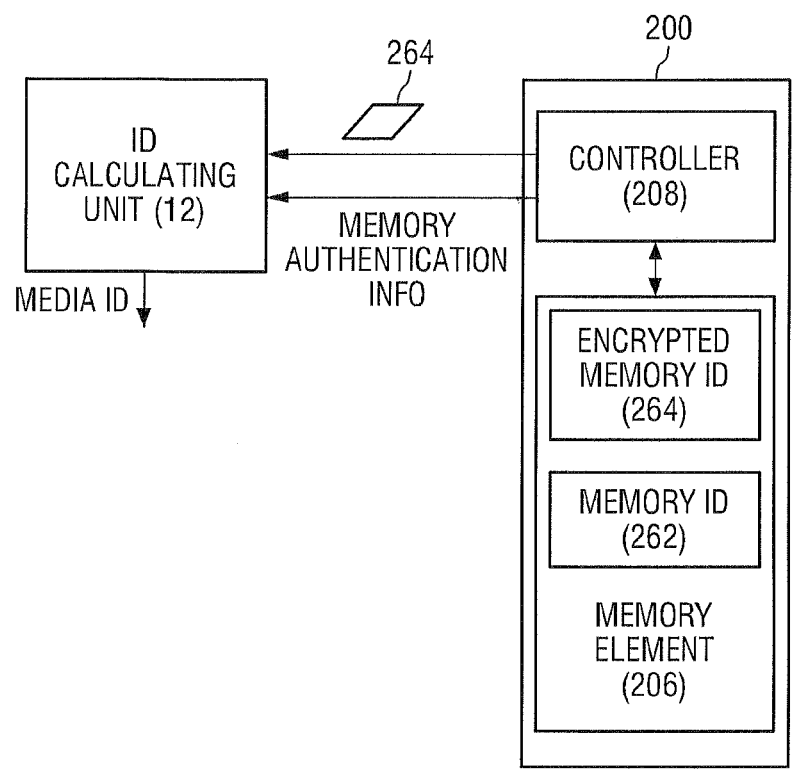
FIGS. 2 and 3 are block diagrams illustrating the configuration related to an ID calculating unit included in the secure key generating apparatus of FIG. 1.

Referring to FIG. 2, the ID calculating unit 12 receives an encrypted memory ID 264 from the storage device 200 as one component of the primitive ID. The encrypted memory ID 264 is data obtained by encrypting a memory ID 262 which is a unique identifier of a memory element 206 included in the storage device 200. The memory ID 262 may be data that was programmed by a vendor of the memory element 206 when the memory element 206 was manufactured. The memory ID 262 may be stored in a system area that is not accessed in the same way as data stored in a user area. The memory ID 262, if stored in the user area, can be deleted, modified, and leaked. The memory ID 262, if stored in the system area that is not accessed, cannot be deleted, modified, or leaked.

Figure 3:
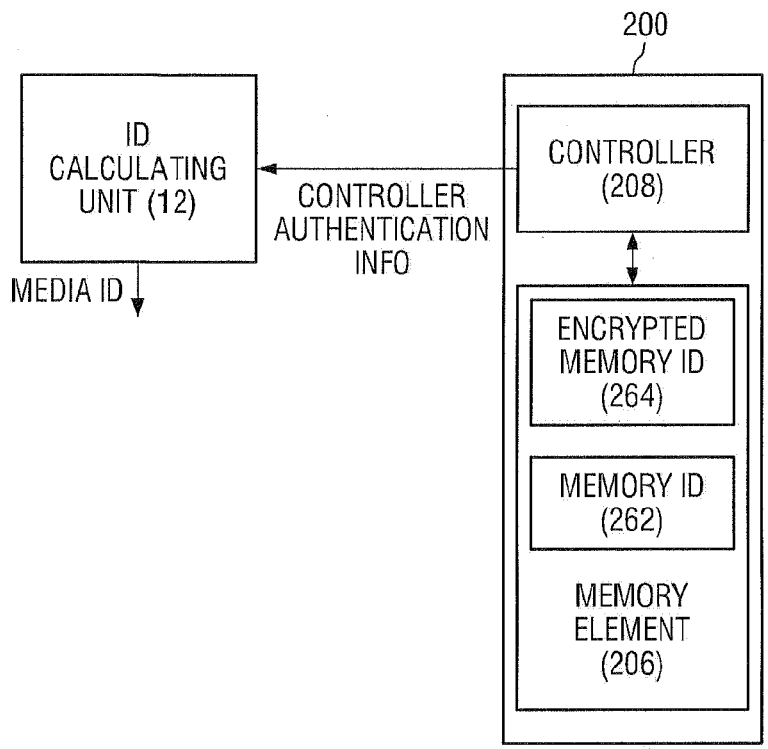

Referring to FIG. 3, the ID calculating unit 12 receives controller authentication information from the storage device 200 as another component of the primitive ID. The secure key generating apparatus 10 and a controller 208 included in the storage device 200 may mutually authenticate each other. The controller authentication information is data that the controller 208 provides to the secure key generating apparatus 10 for this mutual authentication.

Figure 4:
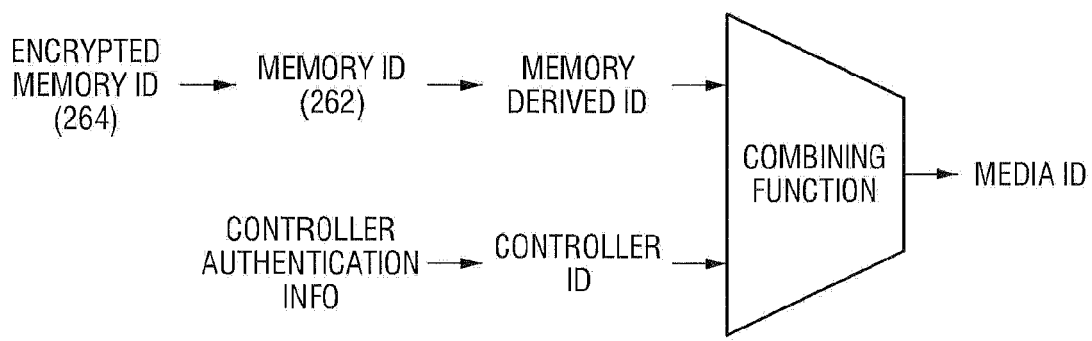
FIG. 4 is a reference diagram illustrating the operation of the ID calculating unit included in the secure key generating apparatus of FIG. 1.

FIG. 4 is a reference diagram illustrating a process in which the ID calculating unit 12 generates a media ID.

The ID calculating unit 12 obtains the memory ID 262 by decrypting the encrypted memory ID 264 and generates a memory derived ID from the memory ID 262. In addition, the ID calculating unit 12 obtains a controller ID, which is a unique identifier of the memory controller 208, from the controller authentication information.

A first decryption key used to decrypt the encrypted memory ID 264 may be received from the storage device 200 in an encrypted form. In addition, a second decryption key used to decrypt the encrypted first decryption key may be stored in a storage unit (not shown) included in the secure key generating apparatus 10.

Thus, the ID calculating unit 12 may receive the encrypted first decryption key from the storage device 200 and obtain the first decryption key by decrypting the encrypted first decryption key using the second decryption key. Then, the ID calculating unit 12 may decrypt the encrypted memory ID 264 into the memory ID 262 using the first decryption key.

The memory derived ID is another unique identifier of the memory element 206. Thus, the memory element 206 may have two unique identifiers, i.e., the memory ID 262 which is a unique identifier programmed by the vendor of the memory element 206 and the memory derived ID which is generated using the memory ID 262. The memory ID 262 is stored in the memory element 206. On the other hand, the memory derived ID is a value that is not stored in the memory element 206 but is generated by the secure key generating apparatus 10 connected to the storage device 200.

The ID calculating unit 12 may generate the controller ID using the controller authentication information. The controller authentication information may include a controller authentication certificate ID and a unique identifier code of the controller 208. The ID calculating unit 12 may generate the controller ID using the controller authentication certificate ID and the unique identifier code. For example, the ID calculating unit 12 may generate the controller ID by performing a string concatenation operation on the controller authentication certificate ID and the unique identifier code.

The ID calculating unit 12 generates the media ID using the memory derived ID and the controller ID. For example, the ID calculating unit 12 may generate the media ID by inputting the memory derived ID and the controller ID to a binary operation or a string concatenation operation.

The configuration and operation of a secure key generating apparatus 20 according to an exemplary embodiment of the present invention will now be described with reference to FIGS. 5 through 7.

Figure 5:
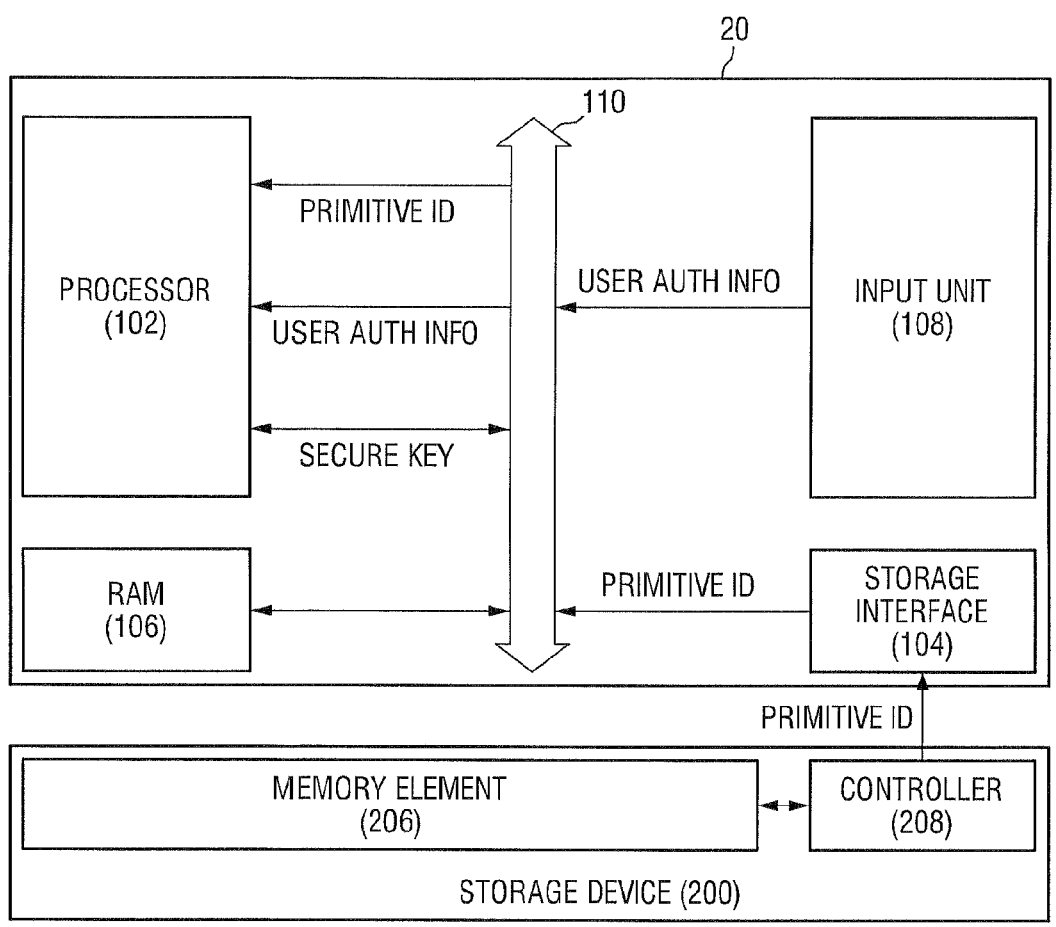
FIG. 5 is a block diagram of a secure key generating apparatus according to an exemplary embodiment of the present invention.

Referring to FIG. 5, the secure key generating apparatus 20 according to the current exemplary embodiment may include a processor 102 and a storage interface 104. The secure key generating apparatus 20 may further include a random access memory (RAM) 106 used as a system memory of the processor 102 and which temporarily stores commands executed by the processor 102 and an input unit 108 which receives user authentication information. The processor 102, the storage interface 104, the RAM 106, and the input unit 108 may be connected to an internal system bus 110.

As shown in FIG. 5, the storage interface 104 may relay data exchanged between the secure key generating apparatus 20 and a storage device 200. The storage interface 104 may receive a primitive ID from the storage device 200 and provide the received primitive ID to the processor 102 through the system bus 110.

The processor 102 calculates a media ID, (a unique identifier of the storage device 200), from the received primitive ID. The processor 102 may generate a Secure Key using both the media ID and authentication information for authenticating a user. The input unit 108 may receive the authentication information from the user and provide the received authentication information to the processor 102. The processor 102 can use the Secure Key for various purposes. For example, the processor 102 may use the Secure Key as the authentication information of the user at a high security level or as an encryption key for content that are to be stored in the storage device 200.

The secure key generating apparatus 20 according to the current exemplary embodiment may support a secure execution environment. The secure execution environment is an environment that ensures safe execution of programs through components such as a processor and an operating system. Safe execution can be ensured through integrity and confidentiality. Generally, a hardware-based secure execution environment approach is known to be safer than a software-based secure execution environment approach. It is assumed that the secure key generating apparatus 20 according to the current exemplary embodiment provides a hardware-based secure execution environment.

Figure 6:
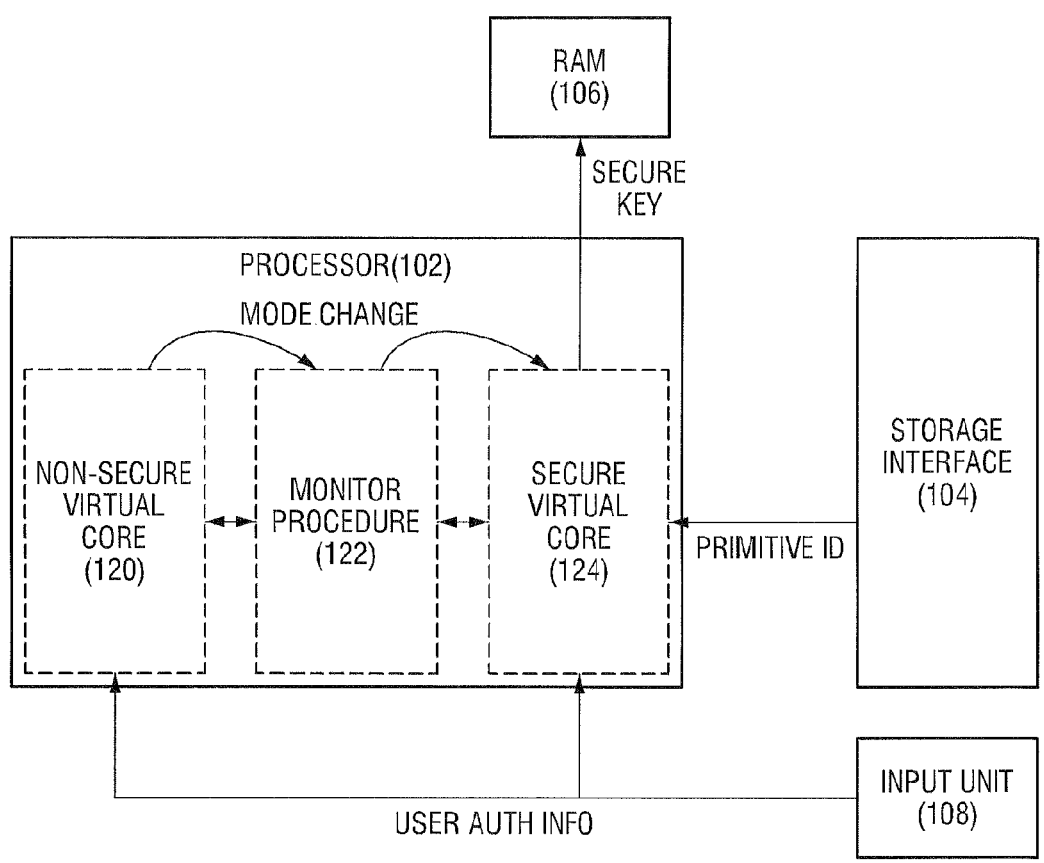
FIGS. 6 and 7 are block diagrams of the secure key generating apparatus of FIG. 5 when the secure key generating apparatus is an apparatus that supports trusted computing.
Figure 7:
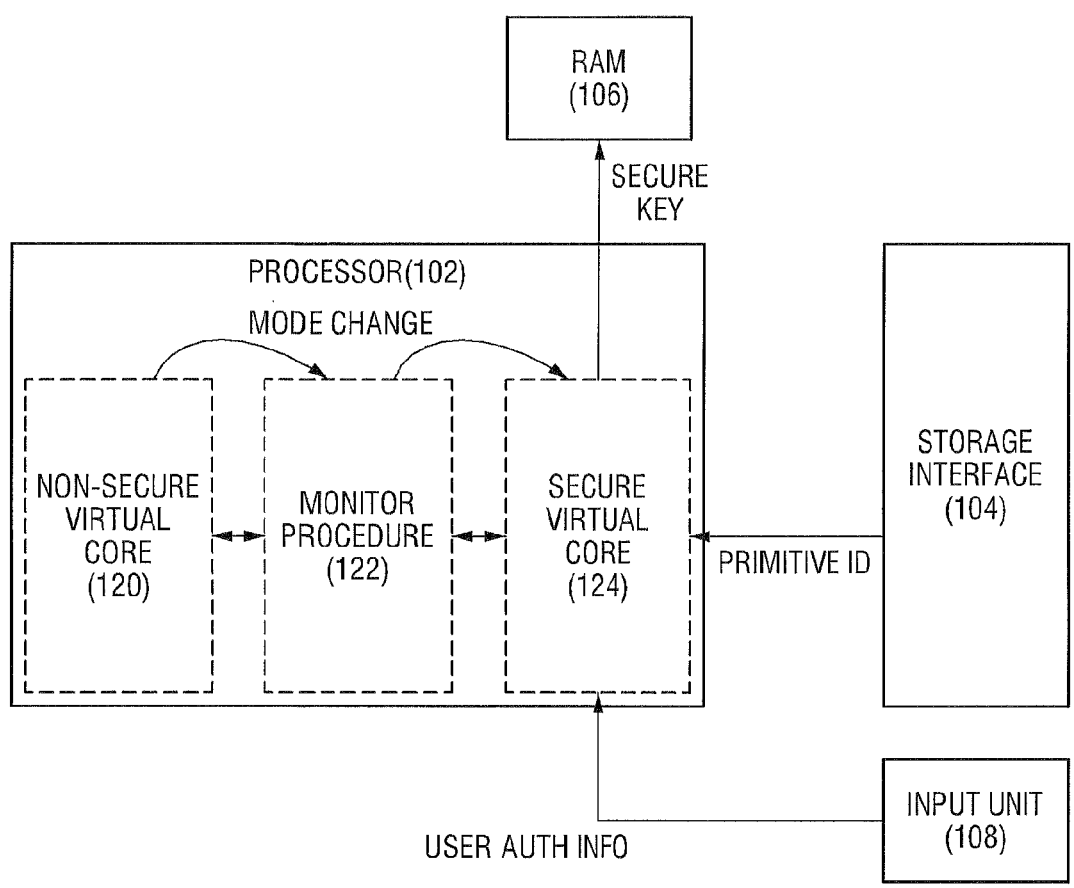

Referring to FIGS. 6 and 7, the secure key generating apparatus 20 may include the processor 102 that includes two cores in order to divide a process execution environment. The processor 102 may include two or more physically separate cores and use them for a secure execution mode and a non-secure execution mode, respectively. Alternatively, the processor 102 may virtually split one core into virtual cores and use them for the secure execution mode and the non-secure execution mode, respectively. In FIGS. 6 and 7, a examples where the processor 102 includes two virtual cores 120 and 124 will be described.

The secure key generating apparatus 20 may prohibit a process executed in the non-secure execution mode that does not provide the secure execution environment from accessing data generated by a process executed in the secure execution mode which does provide the secure execution environment. Thus, data access in the secure execution mode may be separate from data access in the non-secure mode. For example, the RAM 106 may include a first area which can be accessed by a command executed on the non-secure virtual core 120 and a second area which can be only be accessed by a command executed on the secure virtual core 124 and that does not overlap the first area.

If a core of the processor 102 is logically split into the secure virtual core 124 for process execution in the secure execution mode and the non-secure virtual core 120 for process execution in the non-secure execution mode and is operated accordingly, each change between the secure execution mode and the non-secure execution mode can be made by a context switching mechanism.

As a technology of the related that may be included to provide the above-described secure execution environment, the processor 102 may employ at least one of TRUSTZONE of ARM, Wireless TPM of INTEL, M-Shield of Texas Instrument, and security technology of Freescale, SafeXcel TPM of SafeNet, SafeZone of SafeNet, Security Platform of Discretix, and SecureMSM of Qualcomm.

An authentication procedure may be required in order for a process to be executed in the secure execution mode of the processor 102. The authentication procedure may be a procedure of receiving user authentication information and verifying whether the received authentication information is identical to pre-stored authentication information. If it is verified that the received authentication information is identical to the pre-stored authentication information, an interrupt signal for changing the operation mode of the processor 102 from the non-secure execution mode to the secure execution mode may be generated. Then, the processor 102 may switch to the secure execution mode in response to the interrupt signal. Referring to FIG. 6, the processor 102 operating in the non-secure mode performs user authentication in order to switch to the secure execution mode. For the user authentication, the processor 102 receives user authentication information from the input unit 108. When successfully authenticating a user using the user authentication information, the processor 102 changes the virtual core, (e.g., switches from the non-secure virtual core 120 to the secure virtual core 124) via a monitor procedure 122.

Thus, when in the non-secure execution mode, the processor 102 of the secure key generating apparatus 20 according to the current exemplary embodiment receives user authentication information for changing its execution mode. As a result, the processor 102 changes its execution mode to the secure execution mode and generates a Secure Key in the secure execution mode. Since the secure key generating apparatus 20 according to the current exemplary embodiment generates a Secure Key in the secure execution mode, the leakage of user authentication information, a primitive ID, a memory ID, a media ID, etc can be prevented.

The processor 102 of the secure key generating apparatus 20 according to the current exemplary embodiment may also receive user authentication information and a primitive ID after changing to the secure execution mode and generate a Secure Key in the secure execution mode. Referring to FIG. 7, the secure key generating apparatus 20 according to the current exemplary embodiment receives user authentication information and a primitive ID after changing to the secure execution mode and generates a Secure Key therefrom. The RAM 106 included in the secure key generating apparatus 20 according to the current exemplary embodiment may include a secure area which is accessible only when the processor 102 operates in the secure execution mode, and the processor 102 may store the authentication information, the primitive ID, a media ID and the Secure Key in the secure area.

According to the current exemplary embodiment, the secure key generating apparatus 20 already operates in the secure execution mode at a time when it receives user authentication information. Thus, the leakage of user authentication information, a primitive ID, a memory ID, a media ID, etc can be prevented.

The configuration and operation of a secure key generating apparatus 30 according to another exemplary embodiment of the present invention will now be described with reference to FIGS. 8 through 11.

Figure 8:
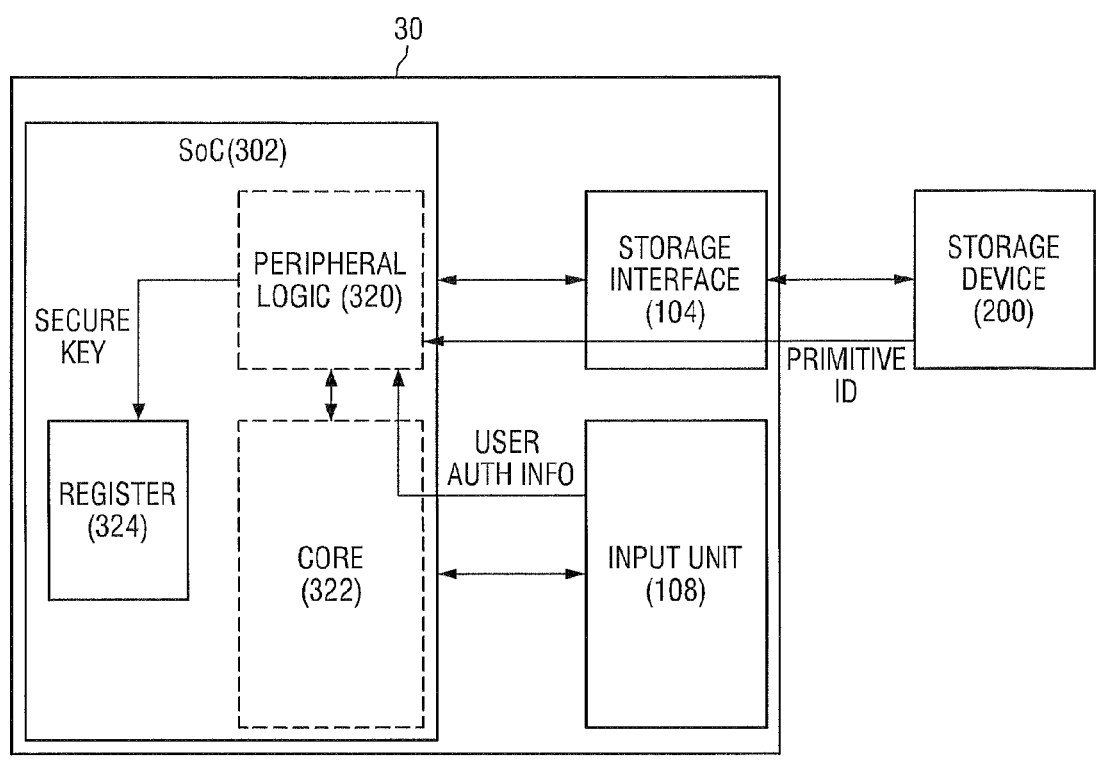
FIG. 8 is a block diagram of a secure key generating apparatus according to an exemplary embodiment of the present invention.
Figure 9:
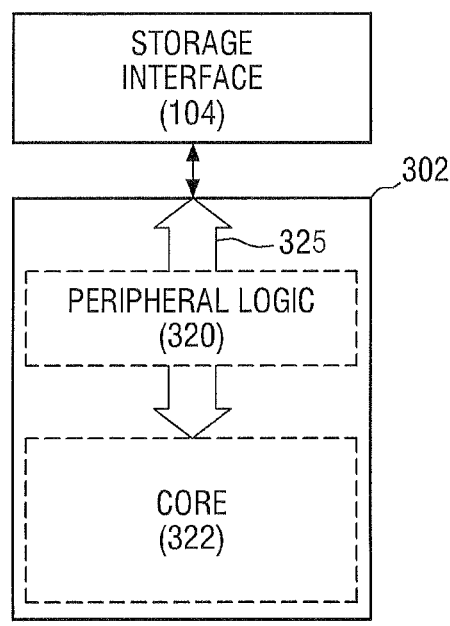
FIG. 9 is a reference diagram illustrating the position of a peripheral logic in the secure key generating apparatus of FIG. 8.

FIG. 8 illustrates the configuration of the secure key generating apparatus 30 according to an exemplary embodiment of the present invention. Referring to FIG. 8, the secure key generating apparatus 30 according to the current exemplary embodiment includes a system-on-chip (SoC) 302 and a storage interface 104 connected to the SoC 302. The storage interface 104 according to the current exemplary embodiment receives a primitive ID from a storage device 200 when connected to the storage device 200 and provides the received primitive ID to the SoC 302.

The SoC 302 is the implementation of a system with various functions as a single chip. The SoC 302 according to the current exemplary embodiment includes a peripheral logic 320 which calculates a media ID (i.e., a unique identifier of the storage device 200) from the primitive ID and generates a Secure Key using both the media ID and authentication information for authenticating a user.

The SoC 302 may further include a core 322 (processor) which executes commands. The core 322 may read commands stored in a RAM (not shown) included in the secure key generating apparatus 30 and execute the read commands (e.g., read commands for reading the primitive ID from the storage device 200). The RAM can be provided inside or outside the SoC 302. The core 322 controls input/output related operations of the secure key generating apparatus 30. For example, the core 322 receives user authentication information input through an input unit 108 from the user. The core 322 provides the user authentication information to the peripheral logic 320.

The peripheral logic 320 receives the user authentication information from the core 322 but may also receive the primitive ID directly from the storage interface 104 without using the core 322. To this end, referring to FIG. 9, the peripheral logic 320 may be connected on a data path 325 between the storage interface 104 and the core 322. The peripheral logic 320 can receive the primitive ID from the storage device 200 through the data path 325 without sending the primitive ID to the core 322. Since the core 322 may be vulnerable to hacking attempts and thus performs no operations using the primitive ID, the peripheral logic 320 does not send the primitive ID to the core 322.

Thus, the peripheral logic 320 operates independently of the core 322 in the generation of a Secure Key. The peripheral logic 320 is responsible for all operations related to the generation of the Secure Key, except for receiving user authentication information from the core 322. In addition, the peripheral logic 320 does not execute programs stored in the RAM. Instead, the peripheral logic 320 executes only secure key generation programs stored in a nonvolatile memory (such as a read-only memory (ROM)) included therein.

The peripheral logic 320 may store the generated Secure Key in a register 324 included in the SoC 302.

Hacking programs intended to steal a Secure Key, a media ID, a memory ID, etc. are generally run on the core 322. Therefore, since the peripheral logic 320 independent of the core 322 is responsible for all operations related to the generation of the Secure Key, the secure key generating apparatus 30 according to the current exemplary embodiment can effectively prevent the leakage (e.g., theft) of data related to the generation of the Secure Key.

Figure 10:
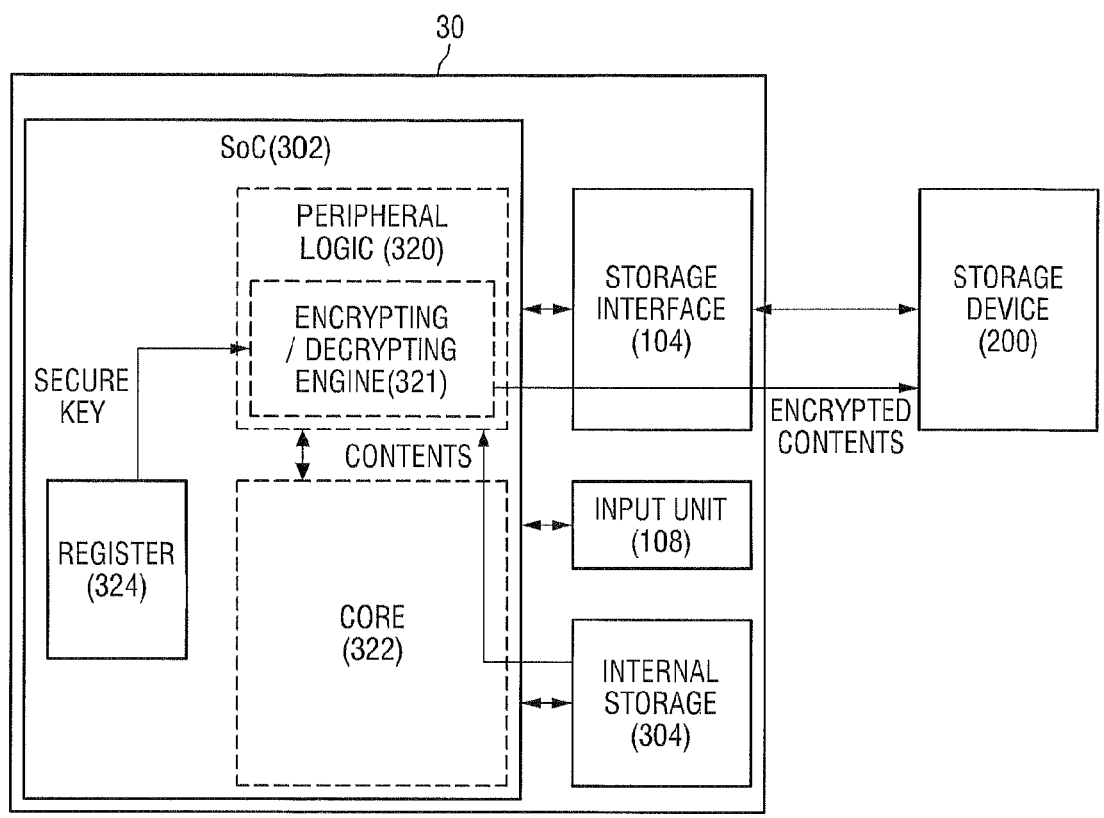
FIGS. 10 and 11 are block diagrams of the secure key generating apparatus of FIG. 8 when the secure key generating apparatus performs encryption and decryption.

Referring to FIG. 10, a secure key generating apparatus 30 according to the current exemplary embodiment may encrypt content using the Secure Key and store the encrypted content in the storage device 200 which is connected to the secure key generating apparatus 30 and provided with the primitive ID to generate a media ID used to generate the Secure Key.

Figure 11:
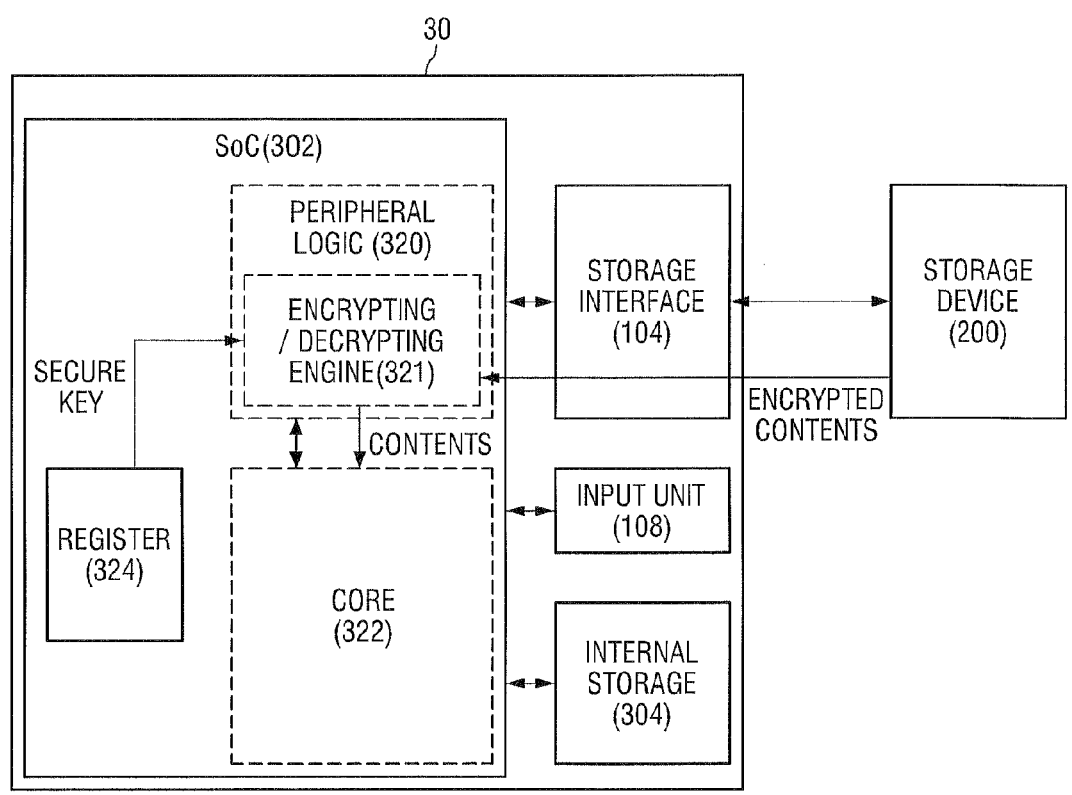

Referring to FIG. 11, the secure key generating apparatus 30 according to the current exemplary embodiment may encrypt content using the Secure Key and store the encrypted content in the storage device 200 which is connected to the secure key generating apparatus 30 and provided with the primitive ID to generate a media ID used to generate the Secure Key. To increase security, the peripheral logic 320 may also be responsible for the encryption of the content to be stored in the storage device 200. The peripheral logic 320 may also be responsible for the decryption of the encrypted content to be retrieved from the storage device 200. To this end, the peripheral logic 320 may include an encrypting/decrypting engine 321. The encrypting/decrypting engine 321 may use the Secure Key stored in the register 324 as an encryption/decryption key.

Since the secure key generating apparatus 30 according to the current exemplary embodiment is connected to the storage device 200, it can decrypt encrypted content stored in the storage device 200. To decrypt the encrypted content, the secure key generating apparatus 30 should generate a decryption key of the encrypted content of the storage device 200. Specifically, the secure key generating apparatus 30 may receive a primitive ID from the storage device 200, receive authentication information from a user of the secure key generating apparatus 30, generate a media ID of the storage device 200 from the primitive ID, and then generate the decryption key of the encrypted content using the media ID and the authentication information.

Each of the above-described secure key generating apparatuses 10, 20 and 30 may be applicable to computers, ultra-mobile PCs (UMPCs), workstations, net-books, personal digital assistants (PDAs), portable computers, web tablets, wireless phones, mobile phones, smart phones, e-books, portable multimedia players (PMPs), portable game devices, navigation devices, black boxes, digital cameras, three-dimensional televisions, digital audio recorders, digital audio players, digital picture recorders, digital picture players, digital video recorders, digital video players, devices capable of transmitting/receiving information in wireless environments, one of various electronic devices constituting a home network, one of various electronic devices constituting a computer network, one of various electronic devices constituting a telematics network, a radio frequency identification (RFID) device, or one of various components constituting a computing system.

Figure 12:
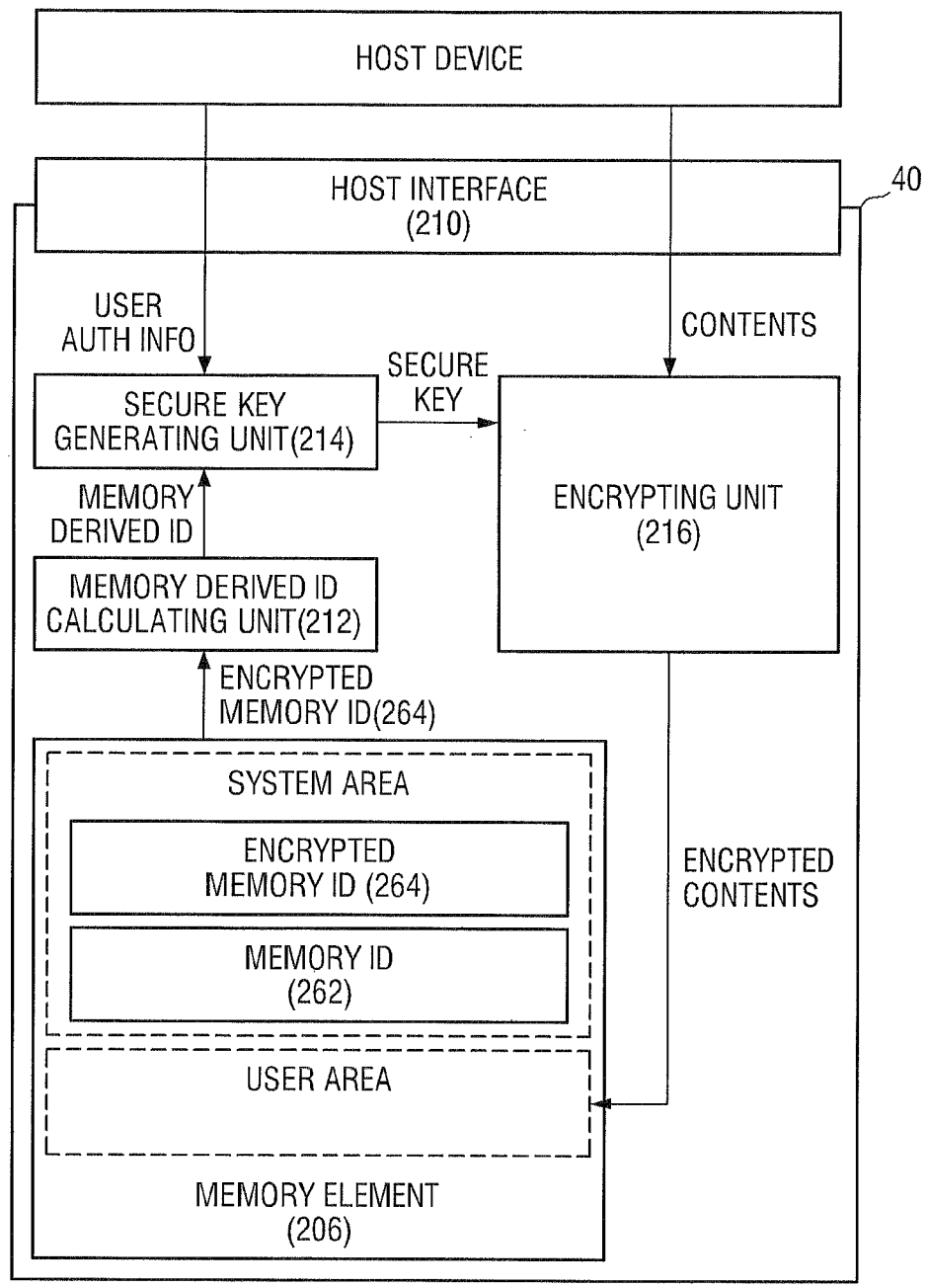
FIGS. 12 and 13 are block diagrams of a storage device according to an exemplary embodiment of the present invention.

A storage device 40 according to an exemplary embodiment of the present invention will now be described with reference to FIGS. 12 through 14. The storage device 40 according to the current exemplary embodiment has an encryption function. Thus, when the storage device 40 is connected to a host device and receives from the host device data to be stored, it does not store the received data as it is received but encrypts the received data and then stores the encrypted data.

The storage device 40 according to the current exemplary embodiment generates an encryption key used to encrypt the received data by using user authentication information received from the host device and a memory derived ID of a memory element 206 included in the storage device 40.

The configuration and operation of the storage device 40 according to the current exemplary embodiment will now be described with reference to FIG. 12. Referring to FIG. 12, the storage device 40 according to the current exemplary embodiment may include the memory element 206, a host interface 210, a memory derived ID calculating unit 212, a secure key generating unit 214, and an encrypting unit 216.

The host interface 210 receives from the host device the authentication information for authenticating a user and provides the authentication information to the secure key generating unit 214. In addition, the host interface 210 receives content (e.g. data) from the host device and provides the content to the encrypting unit 216.

The memory element 206 stores a memory ID 262 and an encrypted memory ID 264 obtained by encrypting the memory ID 262. A storage area of the memory element 206 may be divided into a user area and a system area. The system area is not accessible in the same way that the user area is accessed. The memory ID 262 and the encrypted memory ID 264 are preferably stored in the system area.

The memory element 206 may be a nonvolatile memory and may be a chip or package that uses a NAND-FLASH memory, a NOR-FLASH memory, a phase change random access memory (PRAM), a magnetic random access memory (MRAM), or a resistive random access memory (RRAM) as a storage medium. The memory element 206 may be mounted in packages such as Package on Package (PoP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip On Board (COB), Ceramic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), Thin Quad Flat Pack (TQFP), System In Package (SIP), Multi Chip Package (MCP), Wafer-level Fabricated Package (WFP), and Wafer-level Processed Stack Package (WSP).

The memory derived ID calculating unit 212 reads the encrypted memory ID 264 from the memory element 206, obtains the memory ID 262 by decrypting the encrypted memory ID 264, and generates a memory derived ID, which is another unique identifier of the memory element 206, using the memory ID 262.

The secure key generating unit 214 generates a Secure Key using both the authentication information and the memory derived ID. The secure key generating unit 214 generates the Secure Key in the same way as the secure key generating unit 16 of the secure key generating apparatus 10 of FIGS. 1-4.

The encrypting unit 216 encrypts the content (data) using the Secure Key and stores the encrypted content in the memory element 206.

When encrypting the content received from the host device and storing the encrypted content, the storage device 40 according to the current exemplary embodiment uses an encryption key generated by reflecting a unique identifier of the memory element 206 included in the storage device 40. Therefore, even if the encrypted content stored in the storage device 40 are copied illegally, they are prevented from being decrypted. This is because a storage device which stores the illegally copied encrypted content does not have the same media ID as a media ID in the storage device 40 which stores the original encrypted content.

The encryption key generated in the storage device 40 according to the current exemplary embodiment is generated by further reflecting user authentication information for authenticating a user. Therefore, when the user authentication information is not available, content stored in the storage device 40 cannot be decrypted.

The storage device 40 according to the current exemplary embodiment can be used as a storage device included in a cloud server of a cloud computing service. Thus, content or data uploaded by a user of the cloud computing service are encrypted using both authentication information of the user and the media ID of the storage device 40 and then stored accordingly. In this case, even if the encrypted content or data are hacked and leaked (e.g., stolen) at the server end, they cannot be decrypted unless the leaked content or data are stored in the storage device 40 (which is the storage device that originally stored the leaked content or data), and unless the authentication information of the user is available. Therefore, when the storage device 40 according to the current exemplary embodiment is included in the cloud server of the cloud computing service and used as a storage medium of uploaded content or data, the probability that content or data uploaded by a user will be leaked can be reduced.

The storage device 40 according to the current exemplary embodiment may satisfy a secure digital (SD) card standard of the SD Association. In this case, the host interface 210 may provide the received authentication information to the secure key generating unit 214 as a parameter of a command according to the SD card standard.

The storage device 40 according to the current exemplary embodiment may comply with a solid state drive (SSD) or hard disk drive (HDD) (which includes a flash memory therein) standard. In this case, the host interface 210 may be a physical interface that supports communication commands for mass storage devices, such as advanced technology attachment (ATA), serial-ATA (SATA), small computer small interface (SCSI), PCI-express (PCI-E), or universal serial bus (USB).

Figure 13:
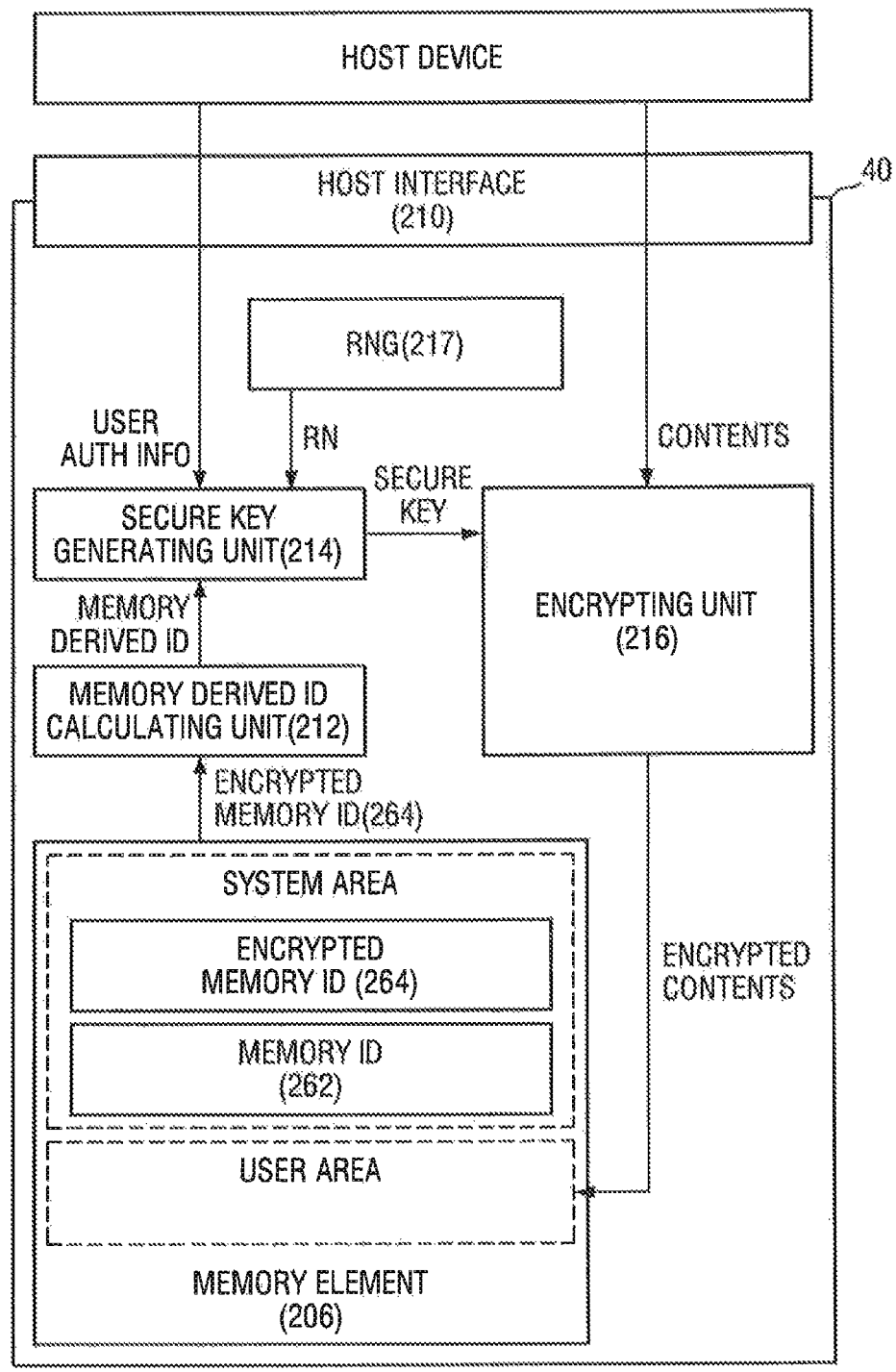

Referring to FIG. 13, the storage device 40 according to the current exemplary embodiment may generate the Secure Key by additionally using a random number. Thus, the secure key generating unit 214 may generate the Secure Key using all of the random number, the authentication information, and the media ID. The storage device 40 according to the current exemplary embodiment may further include a random number generator 217 which generates the random number and provides the generated random number to the secure key generating unit 214. The storage device 40 according to the current exemplary embodiment may operate according to opal security subsystem class (OPAL SSC) specifications of the Trusted Computing Group.

A memory system 1000 according to an exemplary embodiment of the present invention will now be described with reference to FIG. 14.

Figure 14:
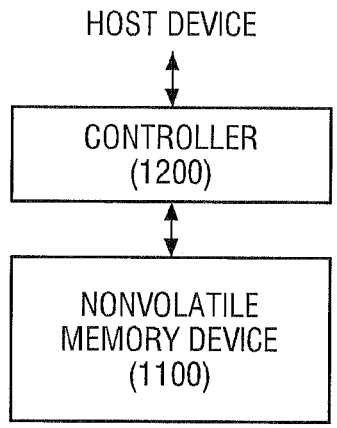
FIG. 14 is a block diagram of a storage system according to an exemplary embodiment of the present invention.

Referring to FIG. 14, the memory system 1000 includes a nonvolatile memory device 1100 and a controller 1200. The storage device 200 described above with respect to FIGS. 1, 2 and 3 may be configured to implement the memory system 1000 (1100 and 1200) of FIG. 14.

The nonvolatile memory device 1100 may include one or more memory elements 206 as described above.

The controller 1200 is connected to a host device and the nonvolatile memory device 1100. The controller 1200 is configured to access the nonvolatile memory device 1100 in response to a request from the host device. For example, the controller 1200 may be configured to control read/write/erase/background operations of the nonvolatile memory device 1100. The controller 1200 may be configured to provide an interface between the nonvolatile memory device 1100 and the host device. The controller 1200 may be configured to drive firmware for controlling the nonvolatile memory device 1100.

The controller 1200 further includes well-known components such as a RAM, a processing unit, a host interface, and a memory interface. The RAM is used as at least one of a working memory of the processing unit, a cache memory between the nonvolatile memory deice 1100 and the host device, and a buffer memory between the nonvolatile memory device 1100 and the host device. The processing unit controls the overall operation of the controller 1200.

The host interface includes a protocol for data exchange between the host device and the controller 1200. For example, the controller 1200 may be configured to communicate with an external device (e.g., the host device) using at least one of various interface protocols such as a USB protocol, a multimedia card (MMC) protocol, a PCI protocol, a PCI-E protocol, an ATA protocol, a serial-ATA protocol, a parallel-ATA protocol, an SCSI protocol, an enhanced small disk interface (ESDI) protocol, and an integrated drive electronics (IDE) protocol. The memory interface interfaces with the nonvolatile memory device 1100. For example, the memory interface includes a NAND flash interface or a NOR flash interface.

The memory system 1000 may further include an error correction block (not shown). The error correction block may be configured to detect and correct an error in data read from the nonvolatile memory device 1100 by using an error correction code (ECC). The error correction block may be provided as a component of the controller 1200. The error correction block can alternatively be provided as a component of the nonvolatile memory device 1100.

The controller 1200 and the nonvolatile memory device 1100 may be integrated into one semiconductor device. As an example, the controller 1200 and the nonvolatile memory device 1100 may be integrated into one semiconductor device to form a memory card. For example, the controller 1200 and the nonvolatile memory device 1100 may be integrated into one semiconductor device to form a PC card (e.g., Personal Computer Memory Card International Association (PCM-CIA)), a compact flash card (CF), a smart media card (SM/SMC), a memory stick, a multimedia card (e.g., MMC, RS-MMC and MMCmicro), a SD card (e.g., SD, miniSD, microSD, and SDHC), or a universal flash storage (UFS).

As another example, the controller 1200 and the nonvolatile memory device 1100 may be integrated into one semiconductor device to form an SSD. The SSD includes a memory element which stores data in a semiconductor memory. When the memory system 1000 is used as an SSD, the operation speed of the host device connected to the memory system 1000 may increase significantly as compared with hard disk drives (HDD).

Each of the components described above with reference to FIGS. 1 through 14 denotes, but is not limited to, a software or hardware component, such as a Field Programmable Gate Array (FPGA) or Application Specific Integrated Circuit (ASIC). A component may advantageously be configured to reside on the addressable storage medium and configured to execute on one or more processors. Thus, the functionality provided for in the components may be combined into fewer components or further separated into additional components.

A secure key generating method according to an exemplary embodiment of the present invention will now be described with reference to FIG. 15.

The secure key generating method according to the current exemplary embodiment can be summarized as a process in which a host device obtains a media ID of a storage device and generates a Secure Key using both the media ID and user authentication information.

Figure 15:
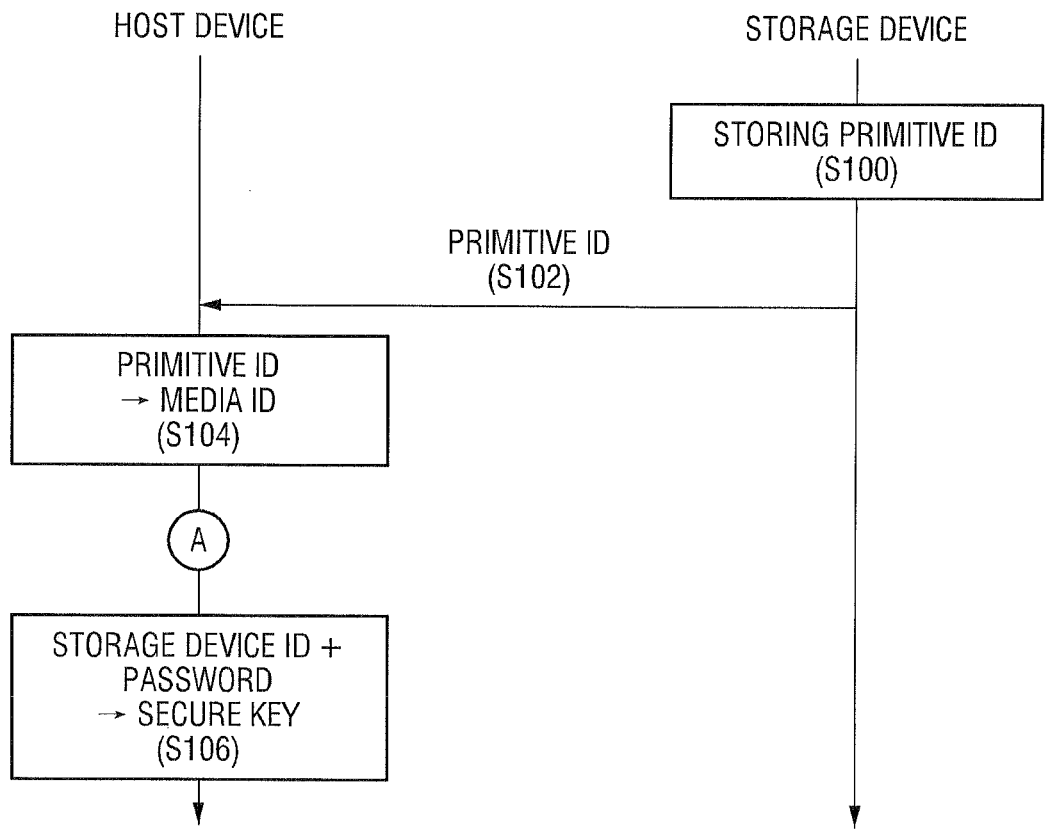
FIG. 15 is a flowchart illustrating a secure key generating method according to an exemplary embodiment of the present invention.

Referring to FIG. 15, a storage device stores a primitive ID (step S100). The primitive ID may be stored in a memory element of the storage device.

A host device receives the primitive ID (step S102) and calculates a media ID, which is a unique identifier of the storage device, from the primitive ID (step S104). The primitive ID includes a first primitive ID and a second primitive ID. A second identifier into which the second primitive ID is converted may be combined with the first primitive ID to produce the media ID. Alternatively, the primitive ID itself may be the media ID. A method of calculating the media ID will be described in greater detail later with reference to FIGS. 19 through 22.

The host device receives user authentication information. The user authentication information may be input by a user to an input unit (not shown) included in the host device or may be input by the user to a terminal (not shown) other than the host device and then provided to the host device.

Figure 16:
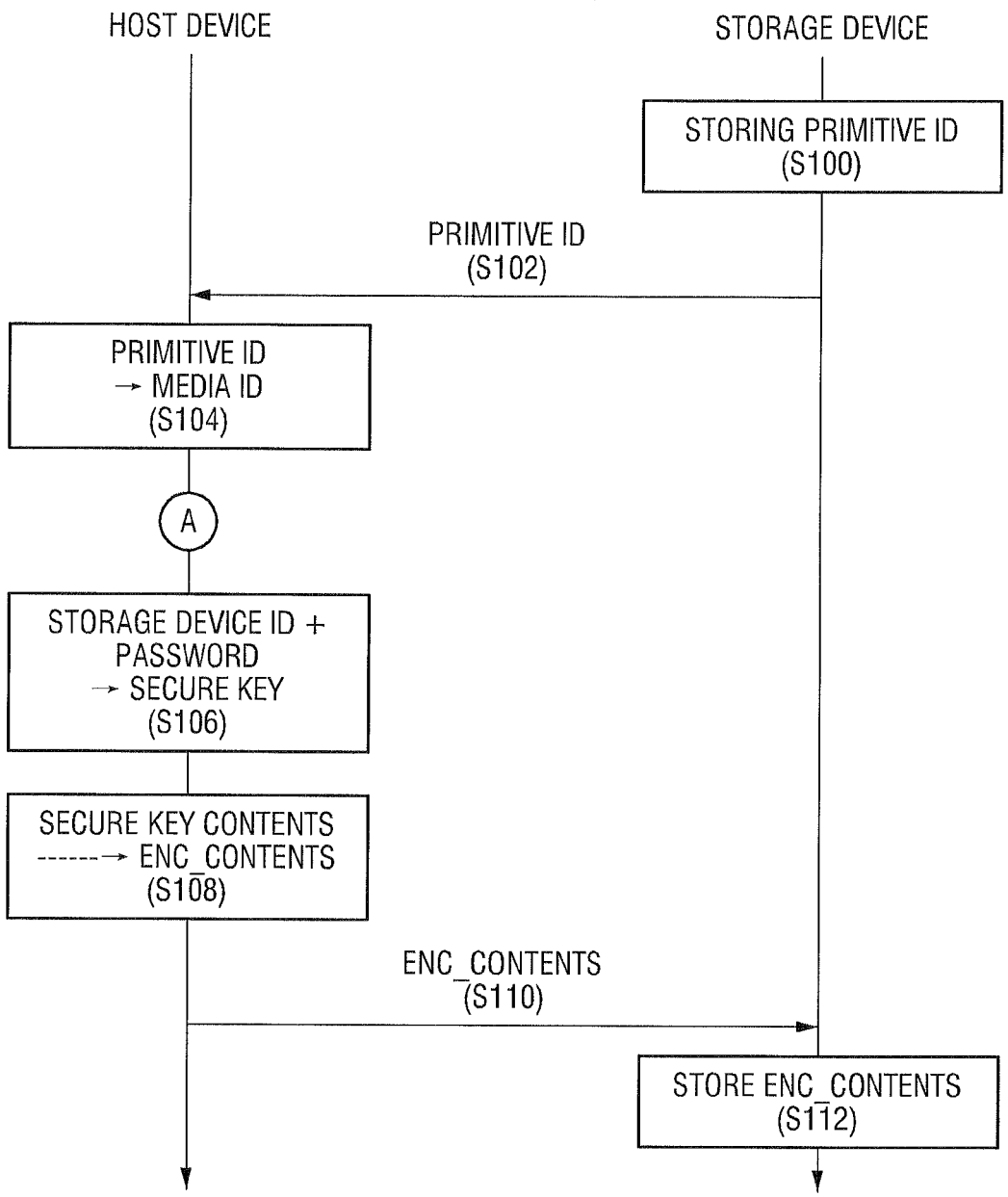
FIG. 16 is a flowchart illustrating a method of generating a Secure Key and encrypting content using the Secure Key according to an exemplary embodiment of the present invention.

FIG. 16 is a flowchart illustrating a method of generating a Secure Key and encrypting content using the Secure Key according to an exemplary embodiment of the present invention. In FIG. 16, steps S100, S102, S104 and S106 for generating a Secure Key are identical to those shown in FIG. 15.

A host device according to the current exemplary embodiment generates encrypted content by encrypting content using the Secure Key or converts the content into the encrypted content (step S108). An encryption algorithm and an encryption key used in the encrypting of the content are not limited to a particular encryption algorithm and a particular encryption key. However, a symmetric key encryption algorithm which uses the same key for encryption and decryption, for example, an advanced encryption standard (AES) encryption algorithm may be used.

The encrypted content are provided to a storage device (step S110), and the storage device stores the encrypted content (step S112). As shown in FIG. 16, the host device may store the encrypted content in the storage device that provided a primitive ID. Thus, the storage device which stores encrypted content need not be different from the storage device which provided a primitive ID.

Referring to FIG. 16, the host device does not provide the Secure Key to the storage device nor includes the Secure Key in the encrypted content. Therefore, to obtain a decryption key of the encrypted content, a media ID of the storage device which stores the encrypted content should be obtained, and the decryption key should be generated from the media ID. The decryption key of the encrypted content cannot be obtained directly from the storage device. Therefore, according to the content encrypting method of FIG. 16, even if the encrypted content are copied illegally to another storage device, they cannot be decrypted.

A method by which the host device calculates a media ID will now be described in more detail with reference to FIGS. 17 through 20.

Figure 17:
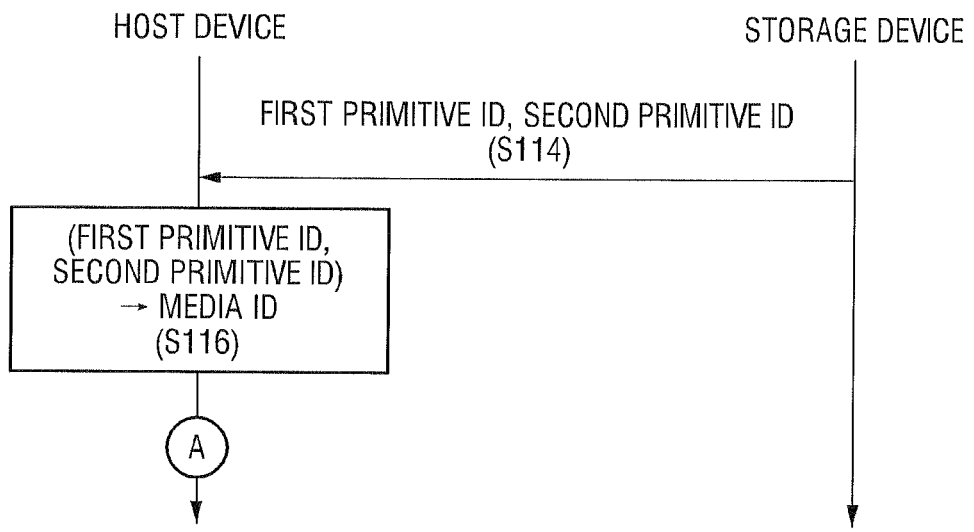
FIGS. 17 through 20 are flowcharts illustrating a method of generating a media ID according to an exemplary embodiment of the present invention.

FIG. 17 illustrates a method of calculating a media ID in a case where a storage device includes a first part and a second part and stores a first primitive ID for identifying the first part and a second primitive ID for identifying the second part. Each of the first part and the second part denotes an element or module included in the storage device and may also be an element group or module group performing a particular function. For example, the second part may be an element, module, element group or module group performing a data storing function, and the first part may be an element, module, element group or module group performing a control function.

Referring to FIG. 17, the host device receives the first primitive ID and the second primitive ID (step S114).

The host device calculates a media ID using at least one of the first primitive ID and the second primitive ID (step S116). When the media ID is calculated using the first primitive ID only, it may be specific to the first part. In addition, when the media ID is calculated using the second primitive ID only, it may be specific to the second part. However, when the media ID is calculated using both the first primitive ID and the second primitive ID, it may be specific to both the first part and the second part.

Figure 18:
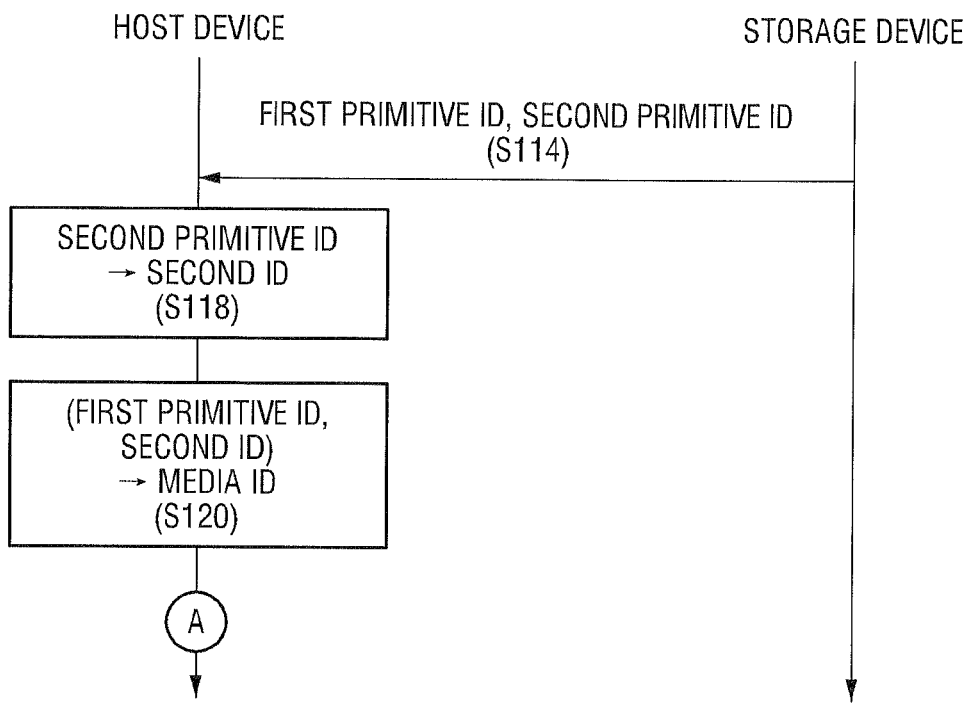

Referring to FIG. 18, the second primitive ID may be converted into a second identifier (step S118), and the media ID may be calculated using at least one of the first primitive ID and the second identifier (step S120). For example, the media ID may be calculated using both the first primitive ID and the second identifier.

When a unique identifier of the second part should not be leaked, data obtained by encrypting the unique identifier of the second part may be provided to the host device as the second primitive ID instead of the unique identifier of the second part. Then, the host device may generate the second identifier, which can be used as another identifier of the second part, using the second primitive ID.

A method of calculating the media ID will now be described with reference to FIGS. 19 and 20.

Figure 19:
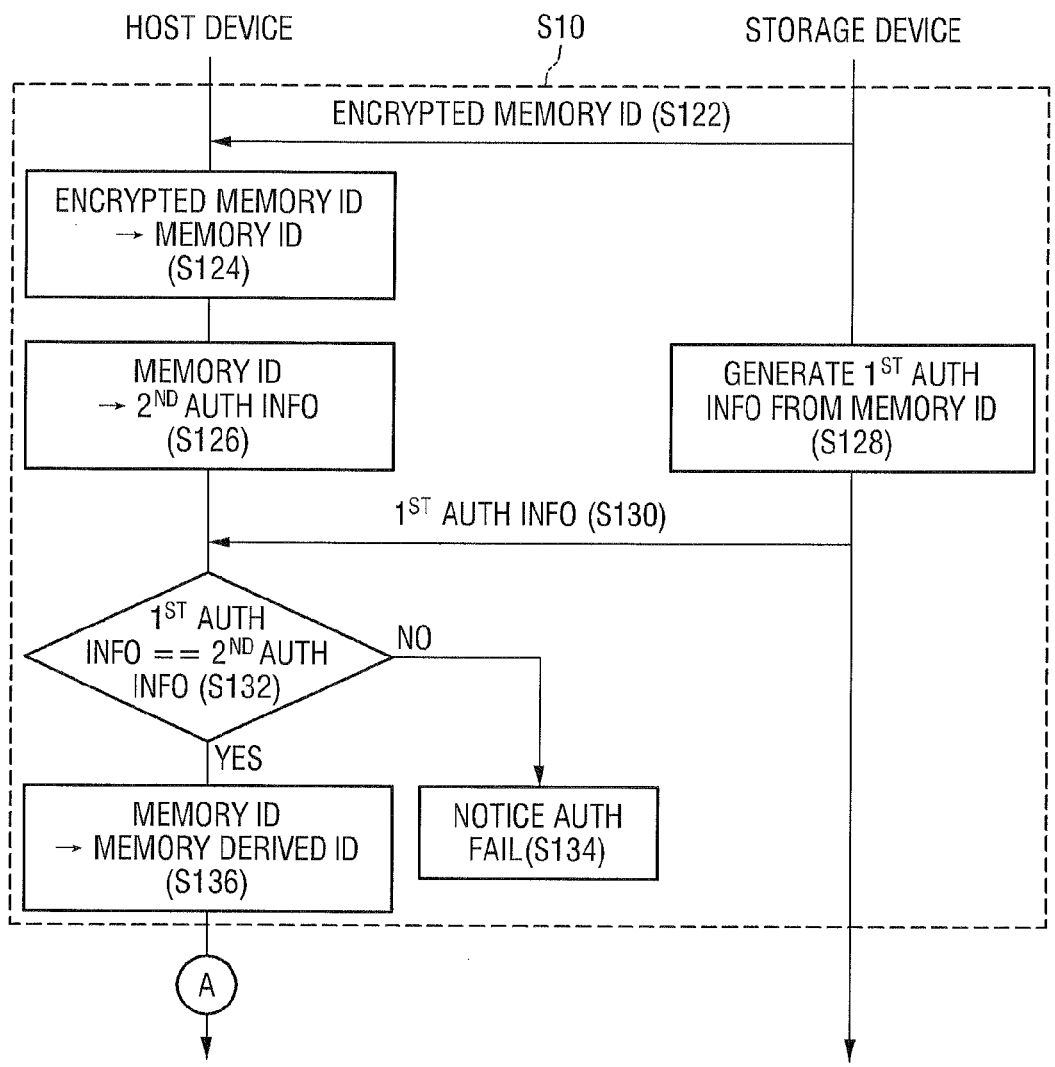

Referring to FIG. 19, the second part may be a memory element, and the first part may be a memory element controller. The memory element stores its unique identifier. A unique identifier of the memory element controller may also be stored in the memory element.

First, a method (step S10) of generating a memory derived ID that can be used as another identifier of the memory element will be described. The memory derived ID can be understood as identical to the second identifier described above with reference to FIG. 18.

The host device receives from the storage device an encrypted memory ID obtained by encrypting the stored unique identifier of the memory element. The encrypted memory ID may also be stored in the memory element. The encrypted memory ID can be understood as identical to the second primitive ID described above with reference to FIG. 18.

The host device generates a memory ID which is the unique identifier of the memory element by decrypting the encrypted memory ID (step S124).

The host device generates second authentication information using the memory ID (step S126). Specifically, the host device may generate a random number, generate a session key by encrypting the random number, and generate the second authentication information by inputting the unique identifier (i.e., the memory ID) of the memory element and the session key to a predetermined one-way function. It is computationally impossible to find a corresponding input value of the one-way function with each output value of the one-way function. The one-way function may be, for example, XOR among bitwise operations that take two operands as inputs.

The storage device generates first authentication information using the memory ID (step S128). A spare key set composed of a plurality of spare keys may be stored in the memory element in addition to the memory ID. The storage device may generate a session key by encrypting one of the spare keys in the spare key set and encrypting the spare key using a random number generated by the host device as an encryption key. Then, the storage device may generate the first authentication information by inputting the session key and the memory ID to a predetermined one-way function.

The host device receives the first authentication information from the storage device (step S130) and verifies whether the first authentication information matches the second authentication information (decision step S132). If it is decided in decision step S132 that the first authentication information does not match the second authentication information (NO branch of decision step S132), a notification of authentication failure may be provided (step S134).

If it is verified in step S132 that the first authentication information matches the second authentication information (YES branch of decision step S132), a memory derived ID is generated using the unique identifier (i.e., the memory ID) of the memory element. The memory derived ID may be generated by inputting the unique identifier (i.e., the memory ID) of the memory element and an application specific secret value (ASSV) to a predetermined one-way function.

The ASSV may be given to each application that runs on the host device. For example, different ASSVs may be given to a music recording application, a video recording application, and a software recording application. The ASSV may have a unique value for each type of content that are encrypted or for each provider ID of the content that are encrypted. Preferably, the ASSV may have a unique value for each type of the content that are encrypted. For example, the type of the content may be whether the content are video, music, document, or software.

Next, a method of receiving the unique identifier (i.e., a controller ID) of the memory element controller (step S20) will be described.

Specifically, a method (step S20) by which the host device receives the unique identifier (i.e., the controller ID) of the memory element controller from the storage device will now be described with reference to FIG. 20.

Figure 20:
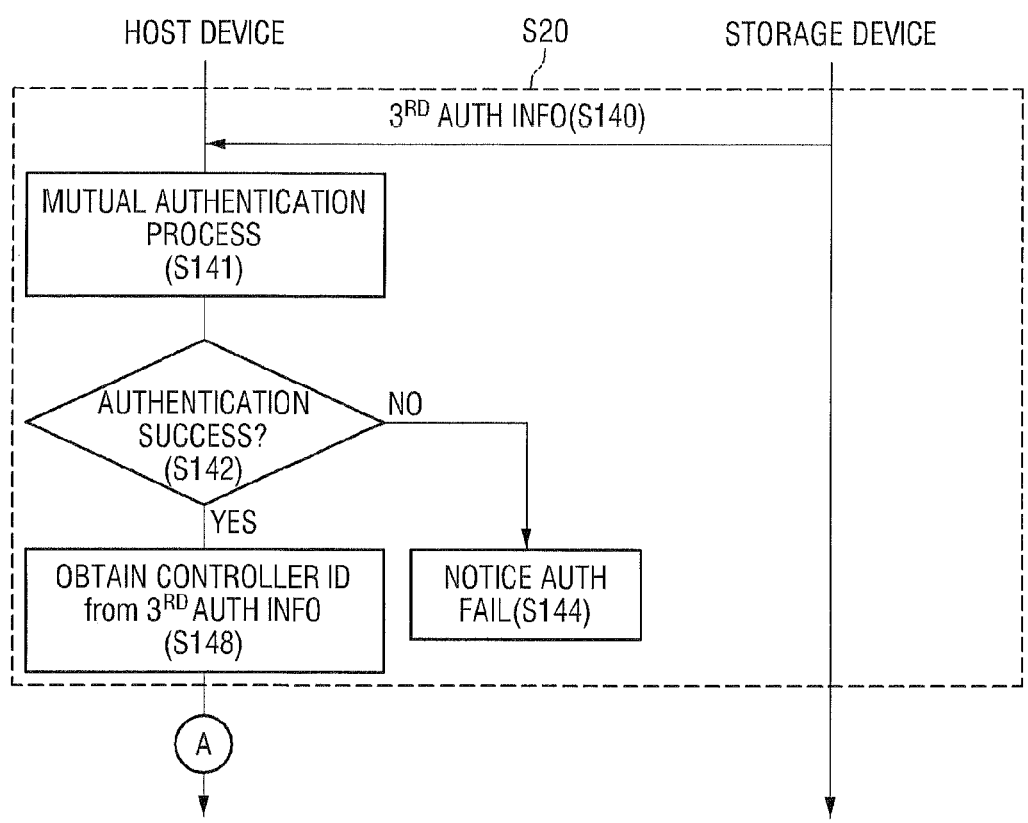

Referring to FIG. 20, a host device receives third authentication information from the storage device (step S140). As already mentioned above, the third authentication information may include an authentication certificate of the storage device and the controller ID of the controller included in the storage device.

The host device and the storage device may mutually authenticate each other (step S141). This mutual authentication may be public key-based authentication. When the mutual authentication fails (NO branch of decision step S142), the host device provides a notification of authentication failure (step S144). When the mutual authentication succeeds (YES branch of decision), the host device may obtain the controller ID from the third authentication information (step S148).

The host device calculates a media ID using at least one of the memory derived ID and the controller ID. Preferably, the host device calculates the media ID using both the memory derived ID and the controller ID.

The media ID may be obtained as a result of performing a binary operation on the memory derived ID and the controller ID. For example, the media ID may be obtained as a result of performing a binary operation (such as AND, OR, XOR or the like) that requires two operands, on the memory derived ID and the controller ID.

The media ID may be obtained as a result of performing an STRCAT operation (i.e., concatenating the memory derived ID and the controller ID) in this order. Alternatively, the media ID may be obtained as a result of performing an STRCAT operation, (e.g., concatenating the controller ID and the memory derived ID) in this order.

A method of generating a Secure Key and decrypting content using the Secure Key according to an exemplary embodiment of the present invention will now be described with reference to FIG. 21.

Figure 21:
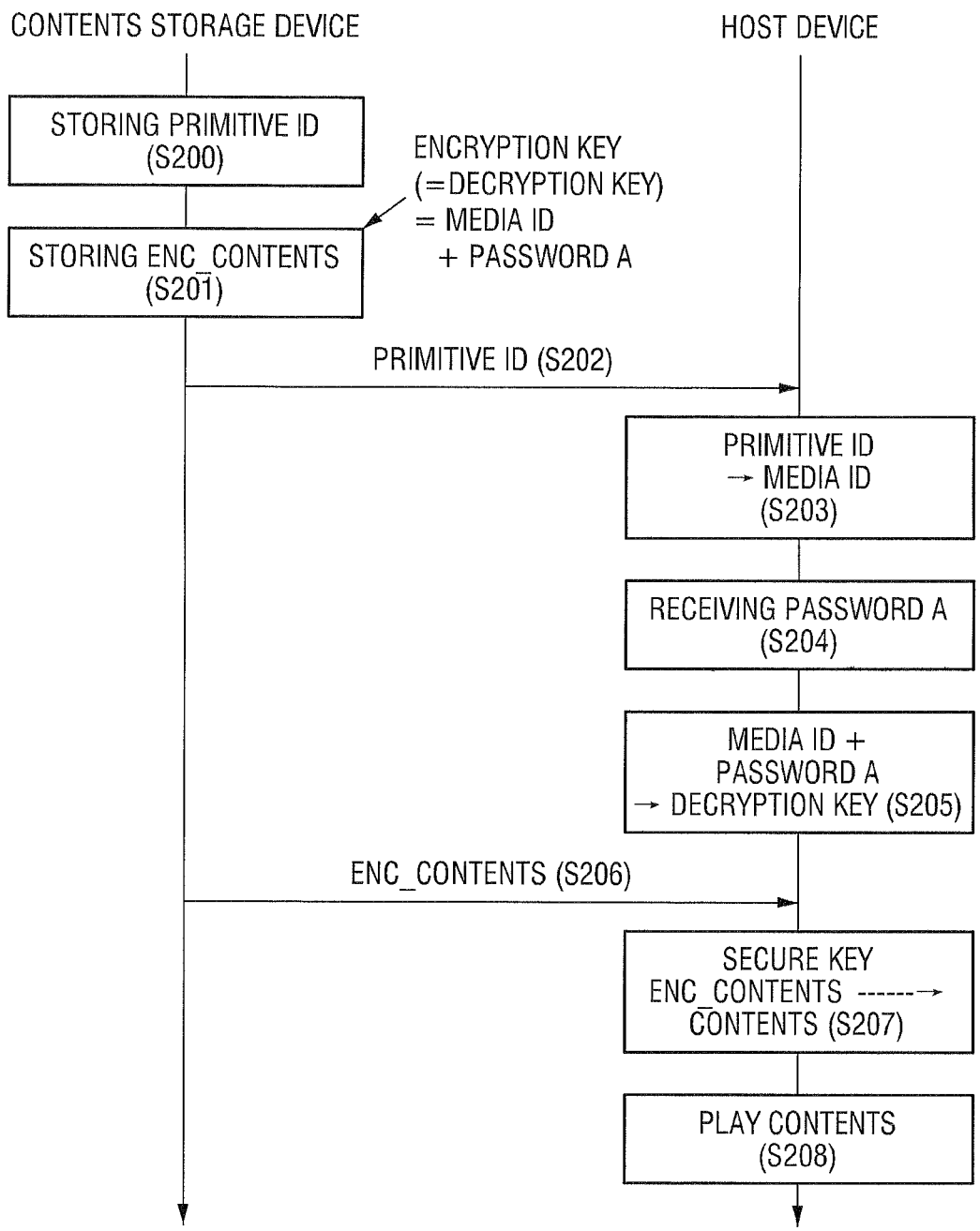
FIG. 21 is a flowchart illustrating a method of generating a Secure Key and decrypting content using the Secure Key according to an exemplary embodiment of the present invention.

Referring to FIG. 21, a primitive ID and encrypted content are stored in a storage device (steps S200 and S201). It is assumed that the encrypted content were generated by encrypting content utilizing an encryption key generated using a media ID of the storage device and user authentication information A (password A).

A host device receives the primitive ID from the storage device (step S202). Although not shown in FIG. 21, the host device may request the storage device to provide the primitive ID and receive the primitive ID in response to the request. The host device may make a request for the primitive ID when receiving a command to play the encrypted content from a user.

The host device calculates the media ID using the primitive ID (step S203). The media ID calculating operation of the host device may be identical to the media ID calculating operation of the host device described above with reference to FIGS. 17 through 20, and thus a repetitive description thereof will be omitted.

The host device receives authentication information (password A) from the user (step S204). The received authentication information may be identical or different from the authentication information used to generate the encryption key for the encrypted content. For ease of description, it is assumed that the received authentication information is identical to the authentication information used to generate the encryption key for the encrypted content.

The host device generates a decryption key using the media ID and the authentication information (step S205).

The generating of the decryption key (step S205) may be performed using the media ID and the authentication information only or using one or more variable or invariable data in addition to the media ID and the authentication information.

The decryption key may be, for example, data produced as a result of performing a binary operation on the media ID and the authentication information. In particular, the decryption key may be data produced as a result of performing an XOR operation. Thus, the decryption key may be data obtained as a result of performing an XOR operation on the media ID and the authentication information.

The decryption key may also be data produced as a result of performing an STRCAT operation on the media ID and the authentication information. In the STRCAT operation, strings can be concatenated in any order. Thus, the media ID and the authentication information can be concatenated in this order or the reverse order.

The host device reads the encrypted content stored in the storage device (step S206), decrypts the encrypted content using the decryption key (step S207), and plays the decrypted content (step S208).

A process in which a host device fails to decrypt encrypted content illegally copied to a content storage device Y (201) from a content storage device X (200) will now be described with reference to FIG. 22.

Figure 22:
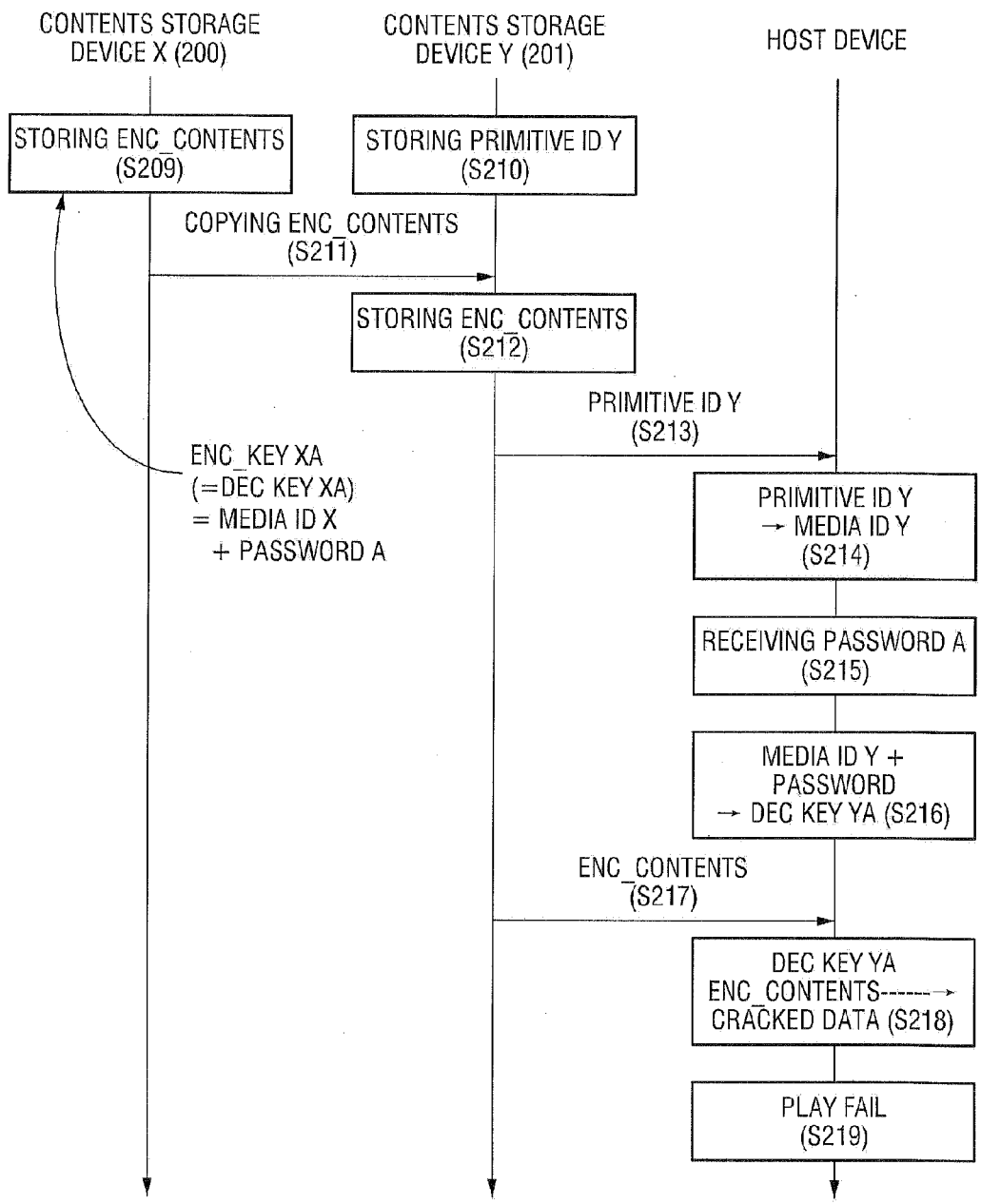
FIG. 22 is a flowchart illustrating a process of failing to decrypt illegally copied content according to an exemplary embodiment of the present invention.

Referring to FIG. 22, a primitive ID Y different from a primitive ID stored in the content storage device X (200) is stored in the content storage device Y (201) (step S210).

In addition, encrypted content obtained prior to the copying was created by encrypting content using the content encrypting method of FIG. 16 are stored in the content storage device X (200) (step S209). It is assumed that authentication information used to generate an encryption key XA is A (password A). Also, it is assumed that a user illegally copied the encrypted content from the content storage device X (200) to the content storage device Y (201) (step S211).

When the user connects the content storage device Y (201) to the host device and inputs a command to play the encrypted content to the host device, the host device receives the primitive ID Y stored in the content storage device Y (201) (step S213).

The host device generates a media ID of the content storage device Y (201) using the primitive ID Y (step S214).

The host device receives user authentication information (step S215). It is assumed that the user authentication information is A (password A) which is identical to the authentication information A used to generate the encryption key XA for the encrypted content.

The host device generates a decryption key YA using the media ID and the user authentication information A (step S216).

The host device attempts to decrypt the encrypted content received from the content storage device Y (201) (step S217) using the generated decryption key YA (step S218). However, since the decryption key YA generated in step S216 is different from a decryption key XA of the encrypted content, the host device cannot decrypt the encrypted content.

Therefore, the host device cannot play the encrypted content illegally copied to and stored in the content storage device Y (201) (step S219).

In FIG. 22, it is assumed that the user input correct authentication information, (e.g., authentication information which is identical to the user authentication information A used to generate the encryption key XA). However, even if the user inputs incorrect authentication information, i.e., authentication information which is different from the user authentication information A used to generate the encryption key XA, the host device cannot play the encrypted content illegally copied to and stored in the content storage device Y (201) (step S219).

Thus, the encrypted content illegally copied to and stored in the content storage device Y (201) cannot be played, irrespective of whether correct user authentication information was input.

FIG. 23 illustrates an exemplary embodiment in which a host device fails to play encrypted content when user authentication information used to generate an encryption key for the encrypted content is not correct.

Referring to FIG. 23, a content storage device X (200) stores encrypted content obtained by encrypting content utilizing an encryption key XA generated using a media ID of the content storage device X (200) and first user authentication information A (password A) (step S209). The first authentication information A is used to generate the encryption key XA for the encrypted content. The encryption key XA also can be used as an decryption key to decrypt the encrypted content.

When a second user connects the content storage device X (200) to the host device and inputs a command to play the encrypted content to the host device, the host device receives a primitive ID X stored in the content storage device X (200).

The host device generates the media ID of the content storage device X (200) using the primitive ID X (step S221).

The host device receives second user authentication information B (password B) from the second user (step S222). It is assumed that the second user authentication information is B which is different from the first authentication information A used to generate the encryption key XA for the encrypted content.

The host device generates a decryption key XB using the media ID and the second user authentication information B (step S223).

The host device attempts to decrypt the encrypted content received from the content storage device Y (201) (operation 224) using the generated decryption key XB (step S225). However, since the generated decryption key XB is different from a decryption key XA of the encrypted content, the host device cannot decrypt the encrypted content.

Therefore, the host device cannot play the encrypted content stored in the content storage device X (200) (step S219).

In FIG. 23, it is assumed that the user of the host device was a second user different from the first user, or was the same first user who input incorrect authentication information, (e.g., authentication information which is different from the user authentication information A used to generate the encryption key XA). However, if the second user inputs correct authentication information, i.e., authentication information which is identical to the first user authentication information A used to generate the encryption key XA, the host device can play the encrypted content.

The present invention can generate a Secure Key which belongs to both a specific device and a specific user. For example, content encrypted using a Secure Key generated by a secure key generating apparatus according to the present invention can be decrypted only when a specific user related to the generation of the Secure Key uses a specific device.

Furthermore, when the secure key generating apparatus supports trusted computing, it generates the Secure Key in a secure mode which supports a trusted computing environment. Therefore, the leakage (e.g., theft) of information, such as user authentication information, a device ID and the generated Secure Key, can be prevented.

Those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:

1. A secure key generating apparatus comprising:
an ID calculating circuit configured to receive a first primitive ID from a first storage device via a storage interface and to calculate a first media ID, from the first primitive ID, wherein the first media ID is a digital identifier of the first storage device;
an authentication information providing circuit configured to provide to a secure key generating circuit user authentication information for authenticating a user, the user authentication information being received via an input unit; and
the secure key generating circuit configured to generate a corresponding Secure Key using both the first media ID and the user authentication information,
wherein the first primitive ID comprises a first encrypted memory ID obtained by encrypting a first memory ID which is an identifier of a first memory element included in the first storage device and by encrypting a first controller ID which is an identifier of a first controller included in the first storage device, and
wherein the ID calculating circuit decrypts the first encrypted memory ID into the first memory ID, calculates a first memory derived ID from the first memory ID, and calculates the first media ID using both the first controller ID and the first memory derived ID.

2. The apparatus of claim 1, wherein the first primitive ID is one or more ID data used to calculate the first media ID and is different data from the first media ID.

3. The apparatus of claim 1, wherein the authentication information providing circuit receives the user authentication information from the current user, wherein the secure key generating circuit is configured to generate the Secure Key using both the first media ID and the current user's user authentication information.

4. The apparatus of claim 2, wherein the ID calculating circuit is configured to receive a second primitive ID from a second storage device and to calculate a second media ID, from the second primitive ID, wherein the second media ID is a digital identifier of the second storage device;
wherein the secure key generating circuit is configured to generate a different Secure Key corresponding to both the second media ID and the user authentication information, and
wherein the second primitive ID is one or more ID data used to calculate the second media ID and is different data from the first primitive ID.

5. The apparatus of claim 1, wherein the ID calculating circuit is configured to receive a second primitive ID from a second storage device and to calculate a second media ID, from the second primitive ID, wherein the second media ID is a digital identifier of the second storage device;
wherein the secure key generating circuit is configured to generate a different Secure Key corresponding to both the second media ID and the user authentication information, and
wherein the second primitive ID is a second encrypted memory ID obtained by encrypting a second memory ID that is an identifier of a second memory element, and the ID calculating circuit decrypts the second encrypted memory ID into the second memory ID, calculates a second memory derived ID from the second memory ID, and uses the second memory derived ID as the second media ID.

6. The apparatus of claim 1, wherein the ID calculating circuit is configured to receive a second primitive ID from a second storage device and to calculate a second media ID, from the second primitive ID, wherein the second media ID is a digital identifier of the second storage device;
wherein the secure key generating circuit is configured to generate a different Secure Key corresponding to both the second media ID and the user authentication information, and
wherein the ID calculating circuit performs an authentication process for the second memory element; and
only if the second memory element is authenticated successfully in the memory element authentication process, the ID calculating circuit calculates a second memory derived ID from the second memory ID.

7. The apparatus of claim 1, wherein the ID calculating circuit is configured to receive a second primitive ID from a second storage device and to calculate a second media ID, from the second primitive ID, wherein the second media ID is a digital identifier of the second storage device;
wherein the secure key generating circuit is configured to generate a different Secure Key corresponding to both the second media ID and the user authentication information, and
wherein the second primitive ID comprises a second controller ID which is an identifier of a second controller included in the second storage device, and the ID calculating circuit calculates the second media ID using the second controller ID.

8. The apparatus of claim 1, wherein the ID calculating circuit is configured to receive a second primitive ID from a second storage device and to calculate a second media ID, from the second primitive ID, wherein the second media ID is a digital identifier of the second storage device;
wherein the secure key generating circuit is configured to generate a different Secure Key corresponding to both the second media ID and the user authentication information, and
wherein the ID calculating circuit and the second controller mutually authenticate each other, and the ID calculating circuit receives the second controller ID in the mutual authentication process.

9. The apparatus of claim 1, wherein the ID calculating circuit is configured to receive a second primitive ID from a second storage device and to calculate a second media ID, from the second primitive ID, wherein the second media ID is a digital identifier of the second storage device;
wherein the secure key generating circuit is configured to generate a different Secure Key corresponding to both the second media ID and the user authentication information, and
wherein the second primitive ID comprises a second encrypted memory ID obtained by encrypting a second memory ID which is an identifier of a second memory element included in the second storage device and by encrypting a second controller ID which is an identifier of a second controller included in the second storage device, and wherein the ID calculating circuit decrypts the second encrypted memory ID into the second memory ID, calculates a second memory derived ID from the second memory ID, and calculates the second media ID using both the second controller ID and the second memory derived ID.

10. The apparatus of claim 3, wherein the ID calculating circuit is configured to receive a second primitive ID from a second storage device and to calculate a second media ID, from the second primitive ID, wherein the second media ID is a digital identifier of the second storage device;

wherein the secure key generating circuit is configured to generate a different Secure Key corresponding to both the second media ID and the user authentication information, and wherein the authentication information providing circuit receives the user authentication information from the current user, wherein the secure key generating circuit is configured to generate a first different Secure Key if using the second media ID and to generate a second different Secure Key if using a different current user's different user authentication information.

11. A secure key generating apparatus comprising:

a storage interface configured to receive a first primitive ID from a first storage device and provide the first primitive ID to a multi-core processor; and the processor configured to calculate a first media ID, which is an identifier of the first storage device, from the first primitive ID and generate a corresponding Secure Key using both the first media ID and authentication information for authenticating a user, wherein the processor operates in one of a non-secure execution mode and a secure execution mode, and the authentication information is used in an authentication process required to change an operation mode of the processor from the non-secure execution mode to the secure execution mode, wherein the processor comprises a non-secure virtual core which executes commands in the non-secure execution mode and a secure virtual core which executes commands in the secure execution mode, the non-secure virtual core verifies the authentication information and generates an interrupt signal when the authentication information is verified successfully, the processor changes the operation mode thereof from the non-secure execution mode to the secure execution mode in response to the interrupt signal, and the secure virtual core generates the Secure Key.

12. The apparatus of claim 11, further comprising a random access memory (RAM), wherein the RAM comprises a first area which can be accessed by a command executed on the non-secure virtual core and a second area which can be accessed by a command executed on the secure virtual core and does not overlap the first area, and the command executed on the non-secure virtual core cannot access the second area.

13. The apparatus of claim 11, further comprising an input circuit receiving the authentication information and providing the authentication information to the processor, wherein the processor operates in one of a non-secure execution mode and a secure execution mode and receives the authentication information from the input circuit in the secure execution mode and generates the Secure Key in the secure execution mode.

14. The apparatus of claim 13, further comprising a random access memory (RAM), wherein the RAM comprises a secure area which is accessible only when the processor operates in the secure execution mode, and the authentication information, the first primitive ID, the first media ID, and the corresponding Secure Key are stored in the secure area.

15. A host device comprising:

a storage interface configured to receive a primitive ID from a first storage device when connected to the first storage device and to provide the first primitive ID to a system-on-chip (SoC); and the SoC connected to the storage interface, wherein the SoC comprises a peripheral logic configured to calculate a first media ID, which is a unique identifier of the first storage device, from the first primitive ID which includes a first memory ID of the first storage device and a controller ID of a controller included in the first storage device and generate a corresponding Secure Key using both the first media ID and user authentication information for authenticating a current user of the host device.

16. The host device of claim 15, wherein the SoC further comprises a core configured to receive the user authentication information and to provide the user authentication information to the peripheral logic.

17. The host device of claim 16, wherein the peripheral logic is connected on a data path between the storage interface and the core.

18. The host device of claim 15, further comprising an input circuit controlled by the SoC, configured to receive the authentication information from the current user, and configured to provide the authentication information to the SoC.

19. The host device of claim 15, wherein the SoC further comprises a register which stores the Secure Key.

20. The host device of claim 15, wherein the peripheral logic is configured to encrypt content using the Secure Key and to provide the encrypted content to the storage device through the storage interface.

21. The host device of claim 15, wherein the storage interface is configured to receive encrypted content from the first storage device and to provide the encrypted content to the SoC, and the peripheral logic is configured to calculate the first media ID, which is the unique identifier of the first storage device, from the first primitive ID and generates the corresponding Secure Key for decrypting the encrypted content using both the first media ID and the authentication information for authenticating the current user.

22. A storage device comprising:

a memory element configured to store a first memory ID which is a unique identifier of the first memory element and a first encrypted memory ID which is obtained by encrypting the first memory ID;

a host interface configured to receive authentication information for authenticating a user from a host device and to provide the authentication information to a secure key generating circuit and to receive content from the host device and to provide the content to an encrypting circuit;

a memory derived ID calculating circuit configured to read the encrypted memory ID from the memory element, to obtain the first memory ID by decrypting the first encrypted memory ID, and to generate a first memory derived ID, which is another unique identifier of the first memory element, using the first memory ID and calculate a first media ID using the first memory derived ID and a controller ID which is an identifier of a controller included in the storage device;

the secure key generating circuit configured to generate a Secure Key using both the authentication information and the first media ID; and the encrypting circuit configured to encrypt the content using the Secure Key and to store the encrypted content in the memory element.

23. The storage device of claim 22, wherein the authentication information is provided by the host device as a parameter of a secure digital (SD) card standard command.

24. The storage device of claim 22, further comprising a random number generator, wherein the secure key generating circuit is configured to generate the Secure Key by further using a random number generated by the random number generator.

25. The storage device of claim 24, wherein the storage device operates according to opal security subsystem class (OPAL SSC) specifications of the Trusted Computing Group.

26. A secure key generating method comprising:

electrically connecting a first storage device to a secure key generating apparatus;

receiving at the secure key generating apparatus a first primitive ID from the first storage device and calculating a first media ID, which is a unique identifier of the first storage device, from the first primitive ID by using the secure key generating apparatus;

receiving at the secure key generating apparatus user authentication information for authenticating a current user directly from the current user or receiving the user authentication information from another device connected through a network; and generating in the secure key generating apparatus a Secure Key utilizing both the first media ID and the user authentication information, wherein the first primitive ID comprises a first encrypted memory ID obtained by encrypting a first memory ID which is an identifier of a first memory element included in the first storage device and by encrypting a first controller ID which is an identifier of a first controller included in the first storage device, and wherein the method further comprises decrypting the first encrypted memory ID into the first memory ID, calculating a first memory derived ID from the first memory ID, and calculating the first media ID using both the first controller ID and the first memory derived ID.

27. The apparatus of claim 1 further comprising:

a second storage device that is not the first storage device.

28. The apparatus of claim 27 wherein:

the second storage device includes the first encrypted memory ID obtained from the first memory element included in the first storage device.

* * * * *